US012747958B2

(12) United States Patent
Yerli

(10) Patent No.: US 12,747,958 B2
(45) **Date of Patent: *Sep. 29, 2026**

(54) SYSTEM AND METHOD ENABLING A COLLABORATIVE 3D MAP DATA FUSION PLATFORM AND VIRTUAL WORLD SYSTEM THEREOF

(71) Applicant: TMRW Group IP, Luxembourg (LU)

(72) Inventor: Cevat Yerli, Dubai (AE)

(73) Assignee: TMRW GROUP IP, Luxembourg (LU)

( * ) Notice: Subject to any disclaimer, the term of this patent is extended or adjusted under 35 U.S.C. 154(b) by 89 days.

This patent is subject to a terminal disclaimer.

(21) Appl. No.: 18/819,861

(22) Filed: Aug. 29, 2024

(65) Prior Publication Data

US 2024/0418525 A1 Dec. 19, 2024

Related U.S. Application Data

(63) Continuation of application No. 17/138,626, filed on Dec. 30, 2020, now Pat. No. 12,104,916.

(Continued)

(51) Int. Cl.

| | |
|---|---|
| ***G01C 21/36*** | (2006.01) |
| ***G01C 21/32*** | (2006.01) |
| ***G06T 7/73*** | (2017.01) |

(52) U.S. Cl.

CPC ......... *G01C 21/3638* (2013.01); *G01C 21/32* (2013.01); *G01C 21/367* (2013.01); *G06T 7/75* (2017.01)

(58) Field of Classification Search

CPC .. G01C 21/3638; G01C 21/32; G01C 21/367; G01C 21/20; G06T 7/75;

(Continued)

(56) References Cited

U.S. PATENT DOCUMENTS 9,478,029 B2 10/2016 Yll et al.
12,002,239 B2 * 6/2024 Jiang ......................... G06T 7/74

(Continued)

FOREIGN PATENT DOCUMENTS

CN 105843223 A 8/2016 ............... G05D 1/02
CN 105869136 A 8/2016

(Continued)

OTHER PUBLICATIONS

Office Action mailed Mar. 8, 2022, issued in Japanese Application No. 2016-502677 (Japanese version), 27 pages.

(Continued)

*Primary Examiner* — Rami Khatib
(74) *Attorney, Agent, or Firm* — BRYAN CAVE LEIGHTON PAISNER LLP

(57) ABSTRACT

A method includes providing a three-dimensional (3D) map data fusion platform in memory of a server comprising at least one processor; providing in the 3D map data fusion platform a map comprising imagery of a real-world location; publishing in the 3D map data fusion platform with reference to the map a real-time virtual replica network (RVRN), wherein the RVRN comprises a plurality of 3D virtual replicas, each of the 3D virtual replicas corresponding to a real-world object in the real-world location and comprising a plurality of object features, the object features including: a real-time position, orientation, and a 3D structure; obtaining a pose of a first client device; performing a simultaneous location and mapping (SLAM) process of a first coordinate space, wherein the SLAM process uses image data from an imaging device of the first client device, the pose of the first client device and data of the map to determine a pose of a first plurality of features within the first coordinate space; creating a first new map comprising 3D coordinates of the first plurality of features within the first coordinate space;

(Continued)

and merging, by the 3D map data fusion platform, the first new map comprising the 3D coordinates of the first plurality of features within the first coordinate space with the published RVRN, creating a fused 3D map.

21 Claims, 11 Drawing Sheets

Related U.S. Application Data

(60) Provisional application No. 62/955,216, filed on Dec. 30, 2019.

(58) Field of Classification Search
CPC . G06T 2207/10032; G06T 2207/20221; G06T 7/579; G06T 17/05; G06T 2200/04; G06T 7/70; G06T 7/20; G06T 19/003; G06T 19/20; G06F 3/011
See application file for complete search history.

(56) References Cited

U.S. PATENT DOCUMENTS

| | | | | |
|---|---|---|---|---|
| 2013/0312086 | A1 | 11/2013 | Hamilton, II et al. | |
| 2016/0026253 | A1 | 1/2016 | Bradski et al. | |
| 2019/0178654 | A1 | 6/2019 | Hare | G06T 7/70 |
| 2019/0222826 | A1 | 7/2019 | Millett | |
| 2019/0279247 | A1 | 9/2019 | Finken et al. | |
| 2019/0378423 | A1 | 12/2019 | Bachrach et al. | |
| 2020/0042012 | A1 | 2/2020 | Zander | G06F 16/27 |
| 2020/0285831 | A1 | 9/2020 | Slatcher | G06T 7/246 |
| 2020/0302510 | A1 | 9/2020 | Chachek | G06V 20/52 |
| 2021/0187391 | A1 | 6/2021 | Ekkati | G06T 19/006 |

FOREIGN PATENT DOCUMENTS

| | | | |
|---|---|---|---|
| CN | 109559277 | A | 4/2019 |
| CN | 110531960 | A | 12/2019 |
| EP | 3572914 | A2 | 11/2019 |
| JP | 2016-502677 | A | 1/2016 |
| WO | 2018/027206 | A1 | 2/2018 |
| WO | 2018/134686 | A2 | 7/2018 |
| WO | 2019167213 | A1 | 9/2019 |

OTHER PUBLICATIONS

Su, W., et al., "Satellite image analysis using crowdsourcing data for collaborative mapping: current and opportunities", International Journal of Digital Earth, vol. 13, No. 6, Dec. 20, 2018, pp. 645-660.
Extended European Search Report mailed May 31, 2021, issued in corresponding European Application No. 20217098, 11 pages.
Egodagamage, R., et al. "A Collaborative Augmented Reality Framework Based on Distributed Visual SLAM," 2017 International Conference on Cyberworlds, Chester, United Kingdom, Sep. 20-22, 2017, pp. 25-32.
Fleck, P., et a. "Visionary Collaborative Outdoor Reconstruction using SLAM and SfM," 2016 IEEE 9th Workshop on Software Engineering and Architectures for Realtime Interactive Systems (SEARIS), Greenville, South Carolina, Mar. 19-23, 2016, 2 pages.

* cited by examiner

1100

SYSTEM AND METHOD ENABLING A COLLABORATIVE 3D MAP DATA FUSION PLATFORM AND VIRTUAL WORLD SYSTEM THEREOF

REFERENCE TO RELATED APPLICATIONS

This application is a Continuation of U.S. patent application Ser. No. 17/138,626, filed on Dec. 30, 2020, which claims the benefit of U.S. Provisional Application No. 62/955,216, filed on Dec. 30, 2019, which are incorporated herein by reference in their entirety.

BACKGROUND ART

Use of imaging devices and simultaneous localization and mapping (SLAM) techniques in order to allow a robot or other device to build a map of an unknown environment while simultaneously keeping track of its current location in said environment is known in the art. Some SLAM techniques may use data from a plurality of imaging devices that is merged in order to generate a collaborative SLAM map.

Usually, the plurality of imaging devices are configured on special-purpose mobile platforms, such as drones or robots, which are responsible for the SLAM mapping. Thus, the current collaboration is typically enabled for specific devices that have as a primary task the mapping of an unknown area, limiting the areas that can be mapped to a reduced number of devices, as the technology is usually not enabled for commonplace user devices. Additionally, the accuracy of the SLAM process from a plurality of imaging devices is considered a limiting factor with current collaborative SLAM technologies, as the position and orientation of some of these devices may not be accurately known at the moment of mapping, decreasing the accuracy and reliability of the created maps. Furthermore, current SLAM maps usually constrain the field of application to navigation and, in some occasions, to further overlaying objects on top of the generated map for creating augmented reality experiences, so that other fields of application are usually disregarded.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems and methods, and more specifically to a system and method enabling an updatable (e.g., configured to be continuously updated, intermittently updated, periodically updated, etc.) collaborative 3D map data fusion platform and a persistent virtual world system thereof.

One or more drawbacks described in the background are addressed through a system and method enabling an updatable collaborative 3D map data fusion platform and a persistent virtual world system thereof. In one aspect, a method of the current disclosure comprises the steps of providing a 3D map data fusion platform in memory of one or more server computers comprising at least one processor; providing in the 3D map data fusion platform a map of a world location; publishing in the 3D map data fusion platform a detailed real-time virtual replica network (RVRN) of a real world place with reference to the map (e.g., aligned, if available, to the coordinates of the map); obtaining the pose (e.g., position and orientation) of a first client device; and performing a simultaneous location and mapping (SLAM) process of a first coordinate space. The SLAM process uses image data from at least one imaging device of the first client device, the pose of the first client device, and/or the data of the map to determine the pose of a first plurality of features within the first coordinate space.

In an embodiment, the method further includes creating a first new map comprising three-dimensional coordinates of the first plurality of features within the first coordinate space and merging the first new map with the published RVRN, creating a fused 3D map. In an embodiment, creating the first new map comprises comparing, through feature matching algorithms by the 3D map data fusion platform, the mapped first plurality of features with the published detailed RVRN. In an embodiment, the comparing step takes place once a threshold number of features of the first coordinate space has been reached (e.g., once a predetermined percentage of a specific area has been mapped and the corresponding features have been obtained). This can help to avoid a situation where, if too few features are obtained, the sample size would be too small to perform a comparison.

Thus, because the newly created map is fused with accurate 3D geometries comprised as part of the published detailed RVRN, or because the newly created map provides further 3D geometries and features to the published detailed RVRN, the fused 3D map comprises a higher density of details and features than the basic map, which may support usage in several applications, such as augmented or virtual reality. Furthermore, using the basic map as a reference for the creation of a detail-rich RVRN, and using the RVRN as a reference for feature matching for the newly created map, some computing power and time may be saved during the creation of the new map, as the areas and/or features that are already included in the RVRN or in the basic map may not need to be remapped.

The system may perform one or more checks to determine whether an RVRN already includes newly mapped features. In an embodiment, if the published detailed RVRN comprises the newly mapped features, the SLAM process may end. However, if the published RVRN does not comprise the newly mapped features, the SLAM process may continue until the first new map of the first coordinate space is created.

In some embodiments, the method further comprises obtaining the pose (e.g., position and orientation) of a second client device, and then initiating a SLAM process of a second coordinate space. In an embodiment, the SLAM process of the second coordinate space uses image data from at least one imaging device of the second client device, the pose of the second client device, and/or the data of the fused 3D map to determine the pose of a second plurality of features within the second coordinate space. In an embodiment, the method further comprises creating a second new map comprising the second plurality of features and merging the second new map with the fused 3D map, creating a collaborative 3D map.

In an embodiment, once enough features of the second coordinate space have been mapped, the method proceeds by comparing, through feature matching algorithms by the 3D map data fusion platform, the mapped second plurality of features with the fused 3D map. If the fused 3D map comprises the newly mapped features, the SLAM process may end. However, if the fused 3D map does not comprise the newly mapped features, the SLAM process may continue until a second map is created.

In yet further embodiments, the method also comprises sharing the collaborative 3D map with a persistent virtual world system comprising virtual replicas, purely virtual objects, applications, or combinations thereof, wherein the newly mapped objects are added to the persistent virtual world system (e.g., as virtual replicas).

In some embodiments, image data is received (e.g., simultaneously) from both the first and second client devices. In such embodiments, the method may include obtaining the poses of the first and second client devices, which may occur after providing the 3D map data fusion platform, the map, and publishing the one or more RVRNs. The method may include simultaneously performing a SLAM process of a first and second coordinate spaces, including capturing image data from at least one imaging device of the first and second client devices, wherein said SLAM processes are performed by using the pose of the first and second client devices to determine the pose of a first and second plurality of features within the first and second coordinate spaces. The method may include checking whether enough features have been extracted, so that the maps of features may be compared and matched to each other. The method may include determining whether the first and second pluralities of features match (e.g., precisely or to a predetermined degree), and if they do match, merging the first and second maps of features, wherein said merging is performed in alignment with the basic map. In an embodiment, the method proceeds by comparing and merging the combined maps with the RVRNs, generating a collaborative 3D map. If the first and second pluralities of features do not match, the method may proceed by separately comparing and merging the first and second maps of features with RVRNs, generating a collaborative 3D map.

In some embodiments, the published RVRN is created through computer-aided drawing (CAD) modeling techniques, or is scanned through one or more computer vision scanning methods. For example, the memory of the at least one server computer may comprise a virtual replica editor which may include software, hardware and/or firmware configured to enable users to model and edit virtual replicas of real world entities, which may be a CAD software that may store data and instructions necessary to input and edit the virtual replicas. The virtual replica editor may enable the input of explicit data and instructions that relate to each digital replica, such as data and instructions that describe the shape, location, position and orientation, physical properties, and the expected functioning and impact of each replica and the system as a whole.

In some embodiments, the SLAM process is partially performed by one or more processors of a client device. In some embodiments, the client device is one or more of a mobile device, smart contact lens, head-mounted display, laptop, desktop computer, camera, drone, and vehicle. The 3D map data fusion platform enables the fusion, through feature comparison and merger algorithms, of a plurality of maps comprising a plurality of features, such as the newly created first map and the map data included in the RVRNs to form a fused 3D map, or the fused 3D map and at least the second map. Moreover, the 3D map data fusion platform enables a plurality of client devices to provide their map data for applying such algorithms in order to merge the plurality of maps, increasing the number of data points available for the platform to generate a collaborative 3D map.

In further embodiments, the method comprises obtaining an identifier code from the first or second client device; associating the identifier code with the first new map or the second new map; and storing the map with which the identifier code is associated in a distributed ledger. The stored identified map may be used, for example, in a reward system comprising providing a reward in relation to the map area contribution by the first or second client device. The reward system may be governed by the rules of a smart contract stored in the distributed ledger. The identifier code may be, for example, a QR code, URL, IP address, MAC address, cryptographic hash, universally unique identifier, or an organizationally unique identifier. The reward may be, for example, cryptocurrencies, coupons, access to further levels of one or more applications, and the like.

In some embodiments, the basic map is obtained via satellite mapping techniques using satellite imagery. In some embodiments, the basic map refers to a plain version of a map, e.g., a map not including a dense number of features and details within an area, which may, as well, omit some details of such features. In some embodiments, the basic map is obtained via satellite mapping techniques using satellite imagery. In some embodiments, the basic map is a 2D map of an area. For example, a basic map may be a map provided by OpenStreetMap™, Google Maps™, or Crowdmap™ In some embodiments, the position and orientation of the client device are obtained through global navigation satellite systems (GNSS), mmW geolocation methods, internal positioning methods, or combinations thereof.

In some embodiments, the method further comprises selecting, through the first or second client device, one or more virtual objects; and overlaying, by the first or second client device, the selected virtual objects on top of one or more locations by using the fused 3D map or collaborative virtual world system as a reference for alignment of the virtual objects.

In some embodiments, the method further comprises adding a per-user entitlement information to the image data, wherein only entitled users have access to viewing the image data of the location.

In some embodiments, the method further comprises adding logic, virtual data and models to at least some of the virtual objects of the persistent virtual world system in order to provide self-computing capabilities and autonomous behavior, wherein the models comprise one or more of a 3D model, a dynamic model, a geometric model, or a machine learning model, or combinations thereof. In yet further embodiments, the persistent virtual world system is employed for autonomous or semi-autonomous management of manufacturing operations, traffic behavior, utilities, or combinations thereof.

In an embodiment, a system enabling an updatable 3D spatial map comprises at least one server computer comprising memory and at least one processor, the memory storing a 3D map data fusion platform, wherein the at least one server computer is configured to provide in the 3D map data fusion platform a map of a world location; publish in the 3D map data fusion platform an RVRN of a real world place with reference to the map; obtain a pose of a first client device; initiate a SLAM process of a first coordinate space, wherein the SLAM process uses image data from at least one imaging device of the first client device and the pose of the first client device to determine a pose of a first plurality of features within the first coordinate space; create a first new map comprising three-dimensional coordinates of the first plurality of features within the first coordinate space; and merge, by the 3D map data fusion platform, the first new map comprising the three-dimensional coordinates of the first plurality of features within the first coordinate space with the published RVRN, creating a fused 3D map.

In an embodiment, creating the first new map comprises comparing, through one or more feature matching algorithms by the 3D map data fusion platform, the first plurality of features with the published RVRN. The comparing step may take place once a threshold number of features of the first coordinate space has been reached.

In some embodiments, the client device includes memory, at least one processor, at least one imaging device configured to capture the image data of a location, and a tracking system providing the position and orientation of the client device.

According to an embodiment, the 3D map data fusion platform comprises instructions which, when executed by the at least one processor, trigger at least one processor to initiate a SLAM process.

In an embodiment, the at least one server computer is further configured to initiate a SLAM process of a second coordinate space, which uses image data from at least one imaging device of a second client device and a pose of the second client device to determine the pose of a second plurality of features within the second coordinate space, create a second new map comprising the second plurality of features, and merge the second new map with the fused 3D map, creating a collaborative 3D map.

In an embodiment, the at least one server computer is further configured to, once enough features of the second coordinate space have been mapped, compare, through feature matching algorithms by the 3D map data fusion platform, the mapped second plurality of features with the fused 3D map; if the fused 3D map comprises the newly mapped features, end the SLAM process; if the fused 3D map does not comprise the newly mapped features, continue the SLAM process until a second map is created.

In some embodiments, the system further comprises a second client device in another location, wherein the 3D map data fusion platform further comprises instructions which, when executed by the at least one processor, trigger the at least one processor to: initiate a SLAM process of a second coordinate space by capturing image data from at least one imaging device of the second client device, wherein said SLAM process is performed by using the pose of the second client device to determine the pose of a second plurality of features within the second coordinate space; once enough features of the second coordinate space have been mapped, compare, through feature matching algorithms by the 3D map data fusion platform, the mapped second plurality of features with the fused 3D map; if the fused 3D map comprises the newly mapped features, end the SLAM process; if the fused 3D map does not comprise the newly mapped features, continue the SLAM process until a second map is created; and merge, by the collaborative 3D map data fusion platform, the created second map of the second coordinate space with the fused 3D map, creating a collaborative 3D map.

According to an embodiment, the collaborative 3D map is shared with a persistent virtual world system comprising virtual replicas, purely virtual objects, applications, or combinations thereof, wherein the newly mapped objects are added to the persistent virtual world system (e.g., as virtual replicas).

According to an embodiment, the at least one server computer is further configured to obtain an identifier code from the first or second client device; associate the identifier code with the first new map; and store the identified first new map in a smart contract implemented in a distributed ledger. In an embodiment, the stored identified map is used in a reward system comprising providing a reward in relation to the map area contribution by the first or second client device.

According to an embodiment, a client device is configured to select one or more virtual objects stored in memory of the at least one server computer; and overlay the selected virtual objects on top of one or more locations by using the collaborative 3D map shared with the persistent virtual world system as a reference for alignment of the virtual objects.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

One or more drawbacks described in the background are addressed through a system and method enabling an updatable collaborative 3D map data fusion platform and a persistent virtual world system thereof. The system and method may employ computer vision techniques for capturing and analyzing imagery of at least one coordinate space captured by a plurality of imaging devices. Through an accurate positioning and tracking of client devices comprising the imaging devices capturing the data and performing a simultaneous location and mapping (SLAM) process, and posterior analysis techniques, the features can be extracted and associated to one or more objects within the coordinate space. The analyzed feature data may be compared to a real-time virtual replica network (RVRN) comprising a plurality of virtual replicas located within a coordinate space published in a 3D map data fusion platform in view of a basic satellite map available in the 3D map data fusion platform.

Said comparison is performed in order to determine whether the imaging devices should continue capturing data and performing the SLAM process. If further map data is necessary because the RVRN does not comprise the mapped features, or because no virtual replica is available of said object, then the system and method may finish the SLAM map and may then merge the newly created map with the published RVRN.

Following a similar logic, image data from other client devices may additionally be compared to the fused 3D map and may, when not already included in the fused 3D map, be merged therewith to create a collaborative 3D map that may accept image data input from a plurality of sources. This collaborative 3D map may be further shared with a persistent virtual world system comprising virtual objects including virtual replicas, purely virtual objects and applications. The data shared by the collaborative 3D map may be added as part of virtual replicas to the persistent virtual world system. In addition, other data and models may be added to the virtual replicas for use in a plurality of applications.

Figure 1:
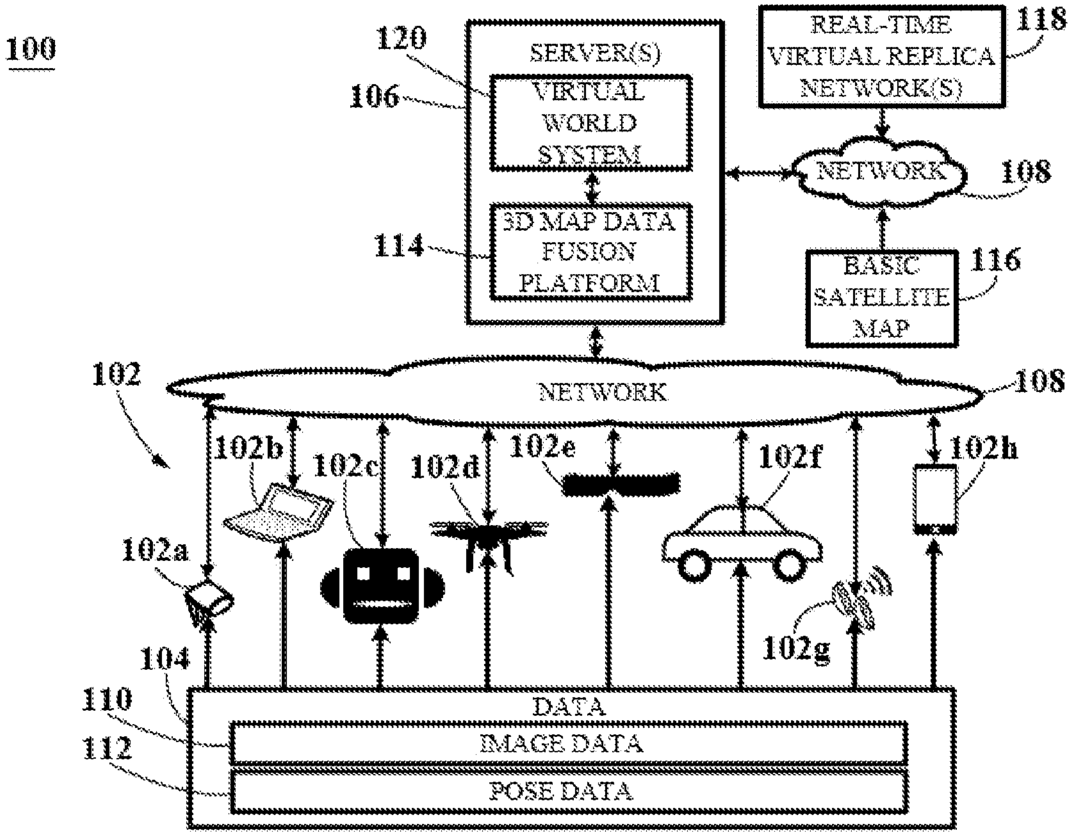
FIG. 1 depicts a schematic representation of a system enabling an updatable collaborative 3D map data fusion platform and a persistent virtual world system thereof, according to an embodiment.

FIG. 1 depicts a schematic representation of a system 100 enabling an updatable collaborative 3D map data fusion platform connected to persistent virtual world system, according to an embodiment.

System 100 comprises a plurality of client devices 102 capturing data 104 from the real world and sending the data 104 to at least one server computer 106 via a network 108. Several examples of client devices 102 are provided in FIG. 1, such as a surveillance camera 102*a*, a laptop computer 102*b*, a robot 102*c*, a drone 102*d*, smart glasses 102*e*, an autonomous vehicle 102*f*, smart contact lenses 102*g*, and a mobile phone 102*h*, although other types of client devices 102 may also be used for providing data 104 to the at least one server computer 106. The data 104 comprises image data 110 of at least one coordinate space (e.g., one or more locations) comprising a first plurality of features, and pose data 112 (e.g., position and orientation) of the client device 102 capturing the image data 110. For example, a first client device such as a drone 102*d* may capture image data 110 of at least one first coordinate space comprising a first plurality of features, and a second client device such as a such as a mobile phone 102*h* may capture image data 110 of at least a second coordinate space comprising a second plurality of features. The data 104 received by the at least one server computer 106 is sent to a 3D map data fusion platform 114 stored in memory, which connects to a persistent virtual world system 120.

The system 100 receives data of a basic satellite map 116, which may be obtained by mapping techniques using satellite imagery of one or more public or private global, regional or local maps connecting to the 3D map data fusion platform 114 (e.g., through a plurality of corresponding application programming interfaces (APIs)). The basic satellite map 116 refers to a plain version of a map, e.g., a map not including a dense number of features and details within an area, which may as well omit some details of such features. In some embodiments, the basic satellite map is a 2D map. In other embodiments, the basic satellite map is a basic 3D map. For example, a basic map may be a map provided by OpenStreetMap™, Google Maps™, or Crowdmap™ The persistent virtual world system 120 receives data pertaining to a real-time 3D virtual replica network (RVRN 118). The RVRN 118 may comprise a plurality of virtual replicas of real-world objects. The virtual replicas may be published by, for example, building owners or state agencies. In some embodiments, the published virtual replica is created through computer-aided drawing (CAD) modeling techniques, or is scanned through one or more computer vision scanning methods. For example, the memory of the at least one server computer 106 may comprise a virtual replica editor which may include software and hardware configured to enable users to model and edit the virtual replicas of the real world entities, which may be a CAD software that may store data and instructions necessary to input and edit the virtual replicas. The virtual replica editor may enable the input of explicit data and instructions that relate to each virtual replica, such as data and instructions that describe the shape, location, position and orientation, physical properties, and the expected functioning and impact of each replica and the system as a whole. Modeling techniques for converting real world entities into virtual replicas with explicit data and instructions and making them available in the persistent virtual world system may be based on readily-available CAD models of the real world entities. The computer vision scanning methods may comprise, for example, employment of synthetic-aperture radars, real-aperture radars, Light Detection and Ranging (LIDAR), inverse aperture radars, monopulse radars, and other types of imaging techniques that may be used to map and model the real world entities before integrating them into the persistent virtual world system.

The 3D map data fusion platform 114, with the data 104 received from the client devices 102, proceeds to initiate a simultaneous location and mapping (SLAM) process of a first coordinate space, wherein said SLAM process is performed by using the pose of the first client device, or the data of the basic satellite map 108, or combinations thereof to determine the pose of a first plurality of features within the first coordinate space retrieved from the image data 110. As used herein, the term "pose" refers to orientation of a device or feature, either alone or in combination with other data, such as position of the device or feature.

Once enough features of the first coordinate space have been mapped, the 3D map data fusion platform 114 then compares, through feature matching algorithms, the RVRN 118 of the one or more coordinate spaces with the features extracted from the newly input image data 110. If the published RVRN 118 does not comprise the features in the image data 110 and corresponding feature pose data, the 3D map data fusion platform 114 proceeds to create, with respect to the pose of the first client device, a first new map of the plurality of features, and then proceeds to merge the first new map comprising the three-dimensional coordinates of the at least one first plurality of features with the RVRN 118 in alignment with the basic map, creating a fused 3D map.

A similar process may apply to image data 110 from other features captured by other client devices. Thus, for example, the 3D map data fusion platform 114 receives the pose data 112 of the second client device, and then proceeds to perform a SLAM process of a second coordinate space using said pose data to determine the pose of a second plurality of features within the second coordinate space. Once enough features of the second coordinate space have been mapped, the 3D map data fusion platform 114 then compares, through feature matching algorithms, the fused 3D map with the newly input image data. If the fused 3D map does not comprise the image data 110 comprising the three-dimensional coordinates, the 3D map data fusion platform 114 proceeds to continue the SLAM process until a second new map of the second plurality of features is created. Finally, the 3D map data fusion platform 114 proceeds to merge the second new map with the fused 3D map, creating a collaborative 3D map.

In the current disclosure, in the context of a coordinate space, the term "features" or "image features" refers to interest points within the coordinate space, which provide information on the image content. Such features may include points, line segments, and/or surfaces described by any suitable means (e.g., Bezier curves or Algebraic Varieties) that may be descriptive of objects in the environment, and may be associated with images or derived characteristics. For example, a plurality of features may be extracted from one or more images of streets, public spaces (e.g., parks or public squares), terrains, and buildings. The features, when joined together, may form a map of the coordinate space comprising the plurality of objects in the images. In other embodiments, the features may be further comprised to indoor interest points, such as objects within an indoor location. Features are fundamental in many applications used for image analysis and processing performed by the 3D map data fusion platform 114, such as for image or map data recognition, matching, reconstruction, etc.

In some embodiments, the image data 110 may be comprised in streams of frames sent by the one or more client devices 102. Through images recorded by one or more imaging devices of the client devices 102 and SLAM techniques performed at least in part by the 3D map data fusion platform 114 on the image data 110 comprised in the frames, the movement of the client devices 102 and the pose of the plurality of features can be determined. In some embodiments, during the SLAM process, at least some of the frames may be optionally kept as key frames. For example, a new key frame may be selected from frames showing a poorly mapped or unmapped part of the coordinate space in question. In some examples, one way to determine that a key frame shows a poorly mapped or unmapped part of the coordinate space is when many new features appear, such as features that do not have any matching correspondence in the RVRN 118 or fused 3D map.

In some embodiments, the collaborative 3D map may then be shared with a persistent virtual world system 120 also stored in memory of the at least one server computer 106. The persistent virtual world system 120 refers to a virtual version of the real world, wherein all or most objects of the real world are represented as corresponding virtual replicas, and wherein other objects, such as purely virtual objects and applications may also be added and configured. The persistent virtual world system 120 may represent an accurate version of the real world. The persistent virtual world system 120 includes the real-world coordinates, such as position, orientation, scale and dimension of real-world objects, the physical properties, and the 3D structure of each of the real objects in the form of real-time 3D virtual replicas.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a nonvolatile storage location (e.g., in the server). In this way, virtual replicas, purely virtual objects and applications may interact and collaborate with each other when being configured for accomplishing specific goals even if users are not connected to the server.

In some embodiments, the system 100 may use a cloud to edge infrastructure that may implement distributed computing capabilities employing public or private cloud servers, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users. In some embodiments, the cloud to edge infrastructure further comprises a distributed ledger-based infrastructure facilitating the transfer and storage of data necessary to widely distribute the 3D map data fusion platform 114 and the persistent virtual world system 120 into a shared deployment.

In some embodiments, in order to reduce hardware and network demands, contribute to the reduction of network latency, and improve the general merged reality experience, the system may connect through a network 108 including millimeter-wave (mmW) or combinations of mmW and sub 6 GHz communication systems, such as through 5th generation wireless systems communication (5G). In other embodiments, the system may connect through wireless local area networking (Wi-Fi) providing data at 60 GHz. Provided communication systems may allow for low latency and high Gbps downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In some cellular network embodiments, the mmW band, also called the extremely high frequency band, is employed. The mmW band spans from 30 to 300 GHz; however, neighboring super-high frequencies from about 10 to 300 GHz may also be included, since these waves propagate similarly to mmW. Mmw-based antennas or combinations of mmW-based antennas and sub GHz antenna systems, because of the extremely high frequency of mmW, are highly reflective, being easily blocked by walls or other solid objects, and may suffer significant attenuation passing through foliage or in tough weather conditions. Therefore, the cellular network antennas may include small, mmW transceivers arranged in a grid pattern, which can help to magnify the collective energy, increase gain, and decrease power losses without increasing transmission power. Techniques known in the art, such as multiple-input, multiple-output, or MIMO, may be used to separate beams at several devices simultaneously or send multiple data streams to a single device, thereby increasing quality of service (QOS). Additionally, the antennas may cover relatively small areas between about 100 meters to about 2 km to ensure accurate propagation of the millimeter waves.

According to an embodiment, tracking of client devices 102 is performed by one or more of the estimated time of arrival (TOA), angle of arrival (AOA)/angle of departure (AOD), and visual imaging techniques (e.g., through imaging devices positioned in areas close to the client devices 102). The tracking may be performed by one or more of radar technology, antennas, Wi-Fi, inertia measuring units, gyroscopes, and accelerometers.

In some embodiments, as the density per square meter of the mmW antennas is higher than with other systems, there is a higher availability of antennas located closer to the client devices, resulting in lower times of arrival between the signals from the antennas to the transmitters and vice-versa, which may be used for the calculation of the estimated position and orientation of the client devices 102 through TOA or other techniques such as the estimated AOA/AOD. Moreover, the estimated client device location provides necessary information for beamformer design. Therefore, once the location of a client device 102 is estimated in an accurate way, the antenna can steer the beam towards the client device 102, either directly using the line-of-sight (LOS) path, through first-order reflectors, or through any other suitable technique. This results in a synergy between localization and communication services while keeping a high QOS. Furthermore, because of the proximity of the antennas and the client devices 102 and the higher QOS, a greater part of the SLAM process may be performed at the servers 106, enabling the employment of lighter or thinner client devices 102.

In other embodiments, global navigation satellite systems (GNSS), which refers to any satellite-based navigation systems like GPS, BDS, Glonass, QZSS, Galilco, and IRNSS, may be used for enabling positioning of client devices 102. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, including, but not limited to, providing data at 60 GHz. In alternative embodiments, the GNSS is augmented via other techniques, such as via differential GPS (DGPS), satellite-based augmentation systems (SBASs), real-time kinematic (RTK) systems. In some embodiments, tracking of client devices 102 is implemented by a combination of AGNSS and inertial sensors in the client devices 102.

Figure 2:
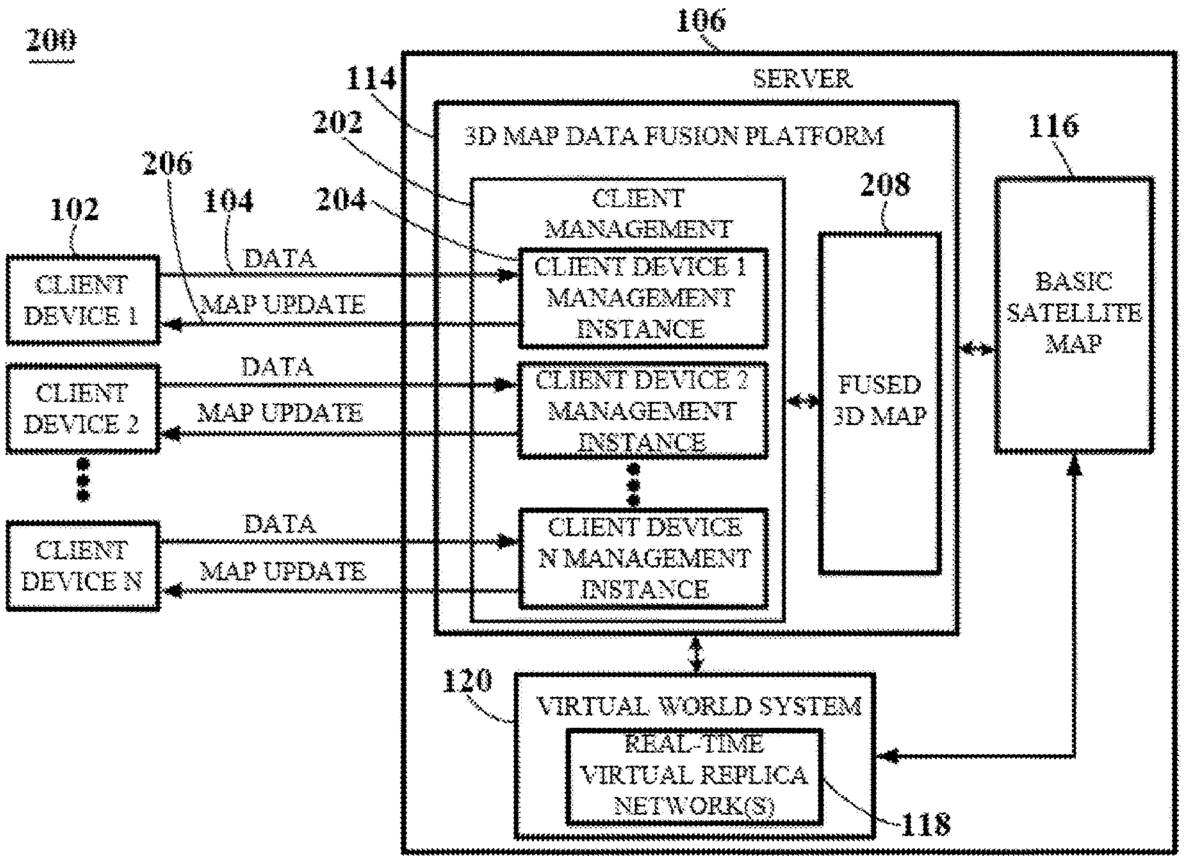
FIG. 2 depicts a schematic representation of another embodiment of a system enabling an updatable collaborative 3D map data fusion platform and a persistent virtual world system thereof.

FIG. 2 depicts a schematic representation of another embodiment of a system 200 enabling an updatable collaborative 3D map data fusion platform and a persistent virtual world system thereof. Some elements of FIG. 2 may be similar to elements of FIG. 1, and therefore the same or similar reference numerals may be used to represent them.

System 200 comprises a plurality of client devices 102, such as client device 1, client device 2, and client device N, all of them capable of sending data to a client management module 202 of the 3D map data fusion platform 114. An individual client device management instance 204 is dynamically created per client device 102 to receive and process the data 104 transferred by each client device 102, and to send corresponding map updates 206 to each client device 102 for further mapping and navigation purposes. For example, processing of the data 104 by the individual client device management instance 204 may comprise implementing a SLAM pipeline for performing SLAM scanning of a coordinate space based on received data 104; implementing one or more feature matching algorithms to compare image data to one or more RVRNs 118 in the persistent virtual world system 120; and creating a map of the coordinate space and merging the map with the available RVRN 118, in view of or aligned with the basic satellite map 116, to create a fused 3D map 208. Further details of the tasks performed by the client management module 202 are described in FIG. 3.

In some embodiments, image data is received (e.g., simultaneously) from multiple client devices. In these embodiments, the 3D map data fusion platform 114 may be configured to first obtain the poses of the client devices 102 (e.g., client devices 1 and 2) and simultaneously perform a SLAM process of first and second coordinate spaces by capturing image data from at least one imaging device of the first and second client devices, wherein said SLAM processes are performed by using the pose of the first and second client devices 102 to determine the pose of a first and second plurality of features within the first and second coordinate spaces. Each individual client device management instance 204 is then configured to simultaneously obtain the data from the corresponding first or second client devices 102 and perform the SLAM processes for each respective coordinate space. The 3D map data fusion platform 114 may be further configured to check whether enough features have been extracted, to subsequently compare and match the plurality of features of each of the coordinate spaces. If the first and second pluralities of features match, then the 3D map data fusion platform may proceed by merging the first and second maps of features, wherein said merging is performed in alignment with the basic satellite map 116, forming a fused 3D map 208. The fused 3D map 208 may be subsequently merged with the RVRNs 118, generating a collaborative 3D map. If the first and second pluralities of features do not match, the 3D map data fusion platform 114 may further separately compare and merge the first and second maps of features with corresponding RVRNs 118, generating a collaborative 3D map.

In the current disclosure, the term "instantiation" refers to the process of virtualizing a server's properties (e.g., memory, computing power, network, operating system, etc.), such as one or more cloud server computers 106, in order to create an instance of the one or more cloud server computers 106 or programs thereof, such as of the client management module 202.

Figure 3:
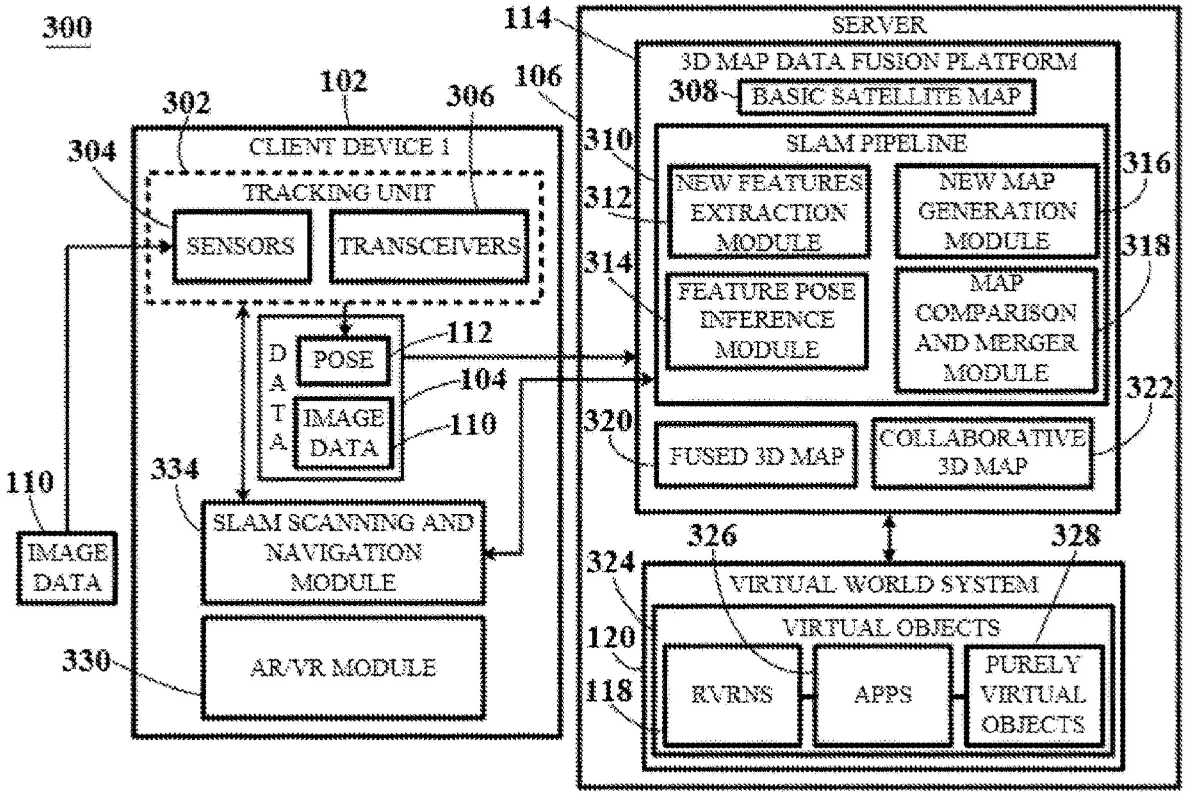
FIG. 3 depicts a schematic representation of a further embodiment of the system enabling an updatable collaborative 3D map data fusion platform and a persistent virtual world system thereof.

FIG. 3 depicts a schematic representation of an embodiment of a system 300 enabling an updatable collaborative 3D map data fusion platform and a persistent virtual world system thereof. Some elements of FIG. 3 may be similar to elements of FIGS. 1-2, and therefore the same or similar reference numerals may be used to represent them.

In FIG. 3, system 300 comprises a client device 102 (e.g., client device 1) sending data 104 to one or more server computers 106. The client device 102 comprises a tracking unit 302 comprising sensors 304 and transceivers 306. The sensors 304 may be implemented as computing hardware, software and/or firmware adapted to obtain at least visual data from the real world and determine/track the pose 112 of the client device 102. In some embodiments, to capture image data, the sensors 304 comprise one or more optical sensors included in one or more of an RGB camera, color camera, grayscale camera, infrared camera, charged couple devices (CCDs), CMOS devices, depth cameras (e.g., LIDARs), or combinations thereof. To determine the pose of the client device 102, the sensors 304 further include one or more Inertia Measuring Units (IMUs), accelerometers, and gyroscopes, which may be used to determine internally the pose of the client device 102 through inertial navigation system (INS) algorithms.

The transceivers 306 may be implemented as computing hardware and software configured to enable devices to receive wireless radio waves from antennas and to send the data back to the antennas. In some embodiments, mmW transceivers 306 may be employed, which may be configured to receive mmW wave signals from antennas and to send the data back to the antennas. The transceiver 306 may be, for example, a two-way communication transceiver 306.

The tracking unit 302 may be implemented by combining the capabilities of the IMU, accelerometers, and gyroscopes with the positional tracking provided by the transceivers 306 and the accurate tracking, low-latency and high QOS functionalities provided by mm W-based antennas, which may enable sub-centimeter or sub-millimeter positional and orientational tracking. This may increase accuracy when tracking the real-time position and orientation of device 102. In alternative embodiments, the sensors 304 and transceivers 306 may be coupled together in a single tracking module device. The at least one processor of the client device 102 may use algorithms such as a Kalman filter, or an extended Kalman filter, to account for the probabilistic uncertainty in the sensor data during tracking of the client device 102. In other embodiments, the at least one processor may further execute jitter reduction algorithms during tracking of the client device 102, e.g., by keeping a constant and consistent error through the SLAM process, rather than estimating the error at each step of the process.

Data 104 comprising pose 112 and image data 110 may be transferred to the 3D map data fusion platform 114 for performing one or more operations on the data 104. In some embodiments, and making reference to FIG. 2, at least some of the operations are performed by a single, dedicated instance of a client management module 202 spawned on demand.

The 3D map data fusion platform 114 comprises a plurality of modules dedicated for one or more specific functions, which may communicate through corresponding APIs to the persistent virtual world system 120 or to each other. In the current disclosure, a "module" may refer to a dedicated computer circuitry, a software application, firmware, a set of computer instructions/software operational on a processor, or a processor itself (e.g., ASIC), for carrying out specific functionality. Some of the modules of the 3D map data fusion platform 114 include a basic satellite map 308, a SLAM pipeline 310 comprising a plurality of modules running computing processes (e.g., commands, program runs, tasks, threads, procedures, etc.), such as a new features extraction module 312, a features pose inference module 314, a new map generation module 316, and a map comparison and merger module 318; and other modules, such as a fused 3D map 320, and a collaborative 3D map 322. Depending on the processes being implemented, the modules may sometimes implement procedures sequentially or in parallel, and may get feedback from each other that may be used in further processing.

The image data 110 is captured by one or more imaging devices of the client device 102 during a coordinated implementation of a SLAM pipeline 310. In some embodiments, the coordinated implementation of the SLAM pipeline 310 is performed at least in part by the 3D map data fusion platform 114 and by the client device 102 through a SLAM scanning and navigation module 334 stored in memory of the client device 102 and executed by at least one processor thereof. In some embodiments, the image data 110 may be pre-processed through computer instructions of the SLAM scanning and navigation module 334 executed by the at least one processor of the client device 102. For example, the at least one processor may generate abstracted image data based on the captured image data 110 before being sent to the server 106. In other examples, in embodiments where the client device 102 is a wearable device (e.g., a head mounted display) the SLAM scanning and navigation module 334 of the client device 102 may be used to translate movement of the body or head of the user when wearing the client device 102, which is information that may be needed for SLAM to be performed.

The new features extraction module 312 of the SLAM pipeline 310 may be configured to extract features from the image data 110 by extracting, from frames where the image data 110 is comprised, visual and structural information about the environment surrounding the client device. For example, the new features extraction module 312 may determine the geometry and/or appearance of the environment, e.g., based on analyzing the preprocessed sensor data received from the SLAM scanning and navigation module 334 of the client device 102. Determination or extraction of a feature may be performed through several algorithms, such as through corner and blob detection, Harris detection, Harris-Laplace detection, Shi-Tomasi, Scale-Invariant Feature Transform (SIFT), Speeded up Robust Features (SURF), Features From Accelerated Segment Test (FAST), Binary Robust Independent Elementary Features (BRIEF), or ORB feature detection algorithms, or combinations thereof. In some embodiments, the new features extraction module 312 may further perform feature tracking and matching processes. Feature tracking is the process of finding the correspondences between features in adjacent frames. For example, feature tracking may be useful when small variations in motion occur between two frames. Feature matching is the process of individually extracting features and matching them over multiple frames, which may be useful when significant changes in the appearance of the features occur. In some embodiments, the new features extraction module 312 may further perform outliers identification and suppression through any suitable technique, such as through the RANSAC method and/or the matching equality technique.

Afterwards, the feature pose inference module 314 of the SLAM pipeline 310 may infer the pose of the extracted features with respect to the given pose of the client device 102. In some examples, this computation may be performed using methods such as Harris Corner Detection, Canny Edge detection, Cross-correlation of known features with images, region finding by color clustering, and boundary finding by gradient aggregation. By comparing the position data of the features and other geometric data, the pose of each of the features can be determined. Subsequently, the new map generation module 316 of the SLAM pipeline 310 may create a map comprising the new features including the corresponding poses. In some cases, the map may not include a significant number of features, which may require the SLAM pipeline 310 to continue until a sufficient number of features is reached. During the new map generation module 316, the SLAM pipeline 310 may simultaneously compare and match features of the new map with those comprised based on the RVRN 118, which may be performed through the map comparison and merger module 318. Thus, the RVRN 118, being comprised of a plurality of virtual replicas, may be considered in these embodiments as a detailed 3D map comprising a plurality of features of corresponding objects. If the RVRN 118 does not comprise the mapped features or only partially comprises the mapped feature, the map comparison and merger module 318 may proceed to merge the features of the newly generated map with the RVRN 118 with respect to the basic satellite map 308 to generate a fused 3D map 320.

In some embodiments, a second or more client devices may simultaneously or asynchronously provide data 104 to the server 106. In these embodiments, image data 110 is captured by one or more imaging devices of the second client device during a coordinated implementation of a SLAM pipeline 310. A similar process as described above may be implemented, such that a SLAM process of a second coordinate space is initiated with data 104 captured by the second client device. Once enough features of the second coordinate space have been mapped, the SLAM pipeline 310 proceeds to compare, through feature matching algorithms, the mapped second plurality of features with the fused 3D map 320. If the fused 3D map 320 does not comprise the newly mapped features, the SLAM pipeline 310 may proceed to continue the SLAM process until a second map is created, which is then merged by the collaborative 3D map data fusion platform 114 with the fused 3D map 320, creating a collaborative 3D map 322.

The 3D map data fusion platform 114 may proceed to share the collaborative 3D map 322 with the persistent virtual world system 120, which may communicate through corresponding APIs. Thus, the collaborative 3D map 322 is then included as part of the persistent virtual world system 120 in the form of RVRNs 118. The persistent virtual world system 120 may further comprise other virtual objects 324, such as applications 326 and purely virtual objects 328 (e.g., virtual objects not existing in the real world, and thus not having a real world counterpart, unlike the RVRNs 118).

In some embodiments, a user is enabled, through a client device 102 connected to the at least one server computer 106, to select one or more virtual objects 324 of the persistent virtual world system 120 and overlay the selected virtual objects 324 on top of one or more locations by using the collaborative 3D map 322 shared with the persistent virtual world system 120 as a reference for alignment of the virtual objects 324. For example, a user may overlay a purely virtual object 328 or an application 326 on a collaboratively created 3D scene and may view the overlaid object in augmented reality (AR) or virtual reality (VR) through an AR/VR module 330 stored in memory of the client device 102.

In some embodiments, generated collaborative 3D maps 322 further comprise per-user entitlement information that can be added to the processed image data by the 3D map data fusion platform 114, wherein only entitled users have access to viewing the image data of the location. For example, some restricted indoor areas may only be visible to certain people with the clearance level that enables them to view those areas, making "normal" users unable to view those areas.

In some embodiments, the applications 326 can be one or more traditional applications, distributed applications or decentralized applications. Traditional applications are typically based on a traditional client-server model and run on a dedicated server in a static infrastructure. Distributed applications are applications stored mostly on cloud computing platforms, such as cloud servers of the current disclosure, and may run on multiple systems and devices simultaneously on the same network, or may run on blockchain or distributed ledger-based distributed databases. Decentralized applications run mainly on decentralized infrastructures such as in blockchains or distributed ledger-based distributed databases. The interaction mechanics with said applications 326 are defined through computer code included in computer scripts and computer programs, and are enabled through the applications 326, smart contracts available in a blockchain or distributed ledger-based distributed database, or combinations thereof. Interactions may be experienced by users in the form of interactive game-like applications or through game-like interaction mechanics.

In some embodiments, the server 106 may be further configured to add logic, virtual data and models to at least some of the virtual objects of the persistent virtual world system in order to provide self-computing capabilities and autonomous behavior. The models may comprise, for example, one or more of a 3D model, a dynamic model, a geometric model, or a machine learning model, or combinations thereof. Thus, the present disclosure enables a way to combine a collaborative SLAM 3D mapping process with a persistent virtual world system 120 that may comprise other advanced features apart from just the geometric and visual properties of the structures in a determined coordinate space for navigation purposes, but may also enable interaction with said structures (e.g., in the form of virtual objects 324), as well as communication between at least some of the structures. For example, the collaborative 3D map shared with the persistent virtual world system 120 of the current disclosure may be used for an efficient autonomous vehicle traffic management, as the vehicles may travel in collaboratively mapped road comprised in the persistent virtual world system 120, while the virtual replicas of the vehicles comprise logic, virtual data and models that enable autonomous behavior for, for example, stopping or adjusting traffic speed during an accident, or recommending/maneuvering a vehicle in the most efficient route during a traffic jam. In other examples, the collaborative 3D map shared with the persistent virtual world system 120 of the current disclosure may be used for management of manufacturing operations, utilities, pollution regulation, and the like.

"Self-computing capabilities," also referred to as "self-managing capabilities" refers herein to the ability of a software entity (e.g., a virtual replica or RVRN 118 of the persistent virtual world system 120) to apply artificial intelligence algorithms in order to autonomously perform tasks, e.g., manage distributed computing resources and adapt to changes in their environment. Self-managing rules and conditions may further be governed through the use of smart contracts running on blockchain or distributed ledger technologies, to further codify the rules and conditions in a distributed and transparent way. Thus, each virtual replica may act autonomously depending on the conditions in the real world reflected in the persistent virtual world system 120, by allocating required resources, autonomously sending and executing commands and generating events as required by each circumstance. Achieving this type of behavior may require training the virtual replicas with artificial intelligence algorithms during the modeling of the virtual replicas.

Figure 4:
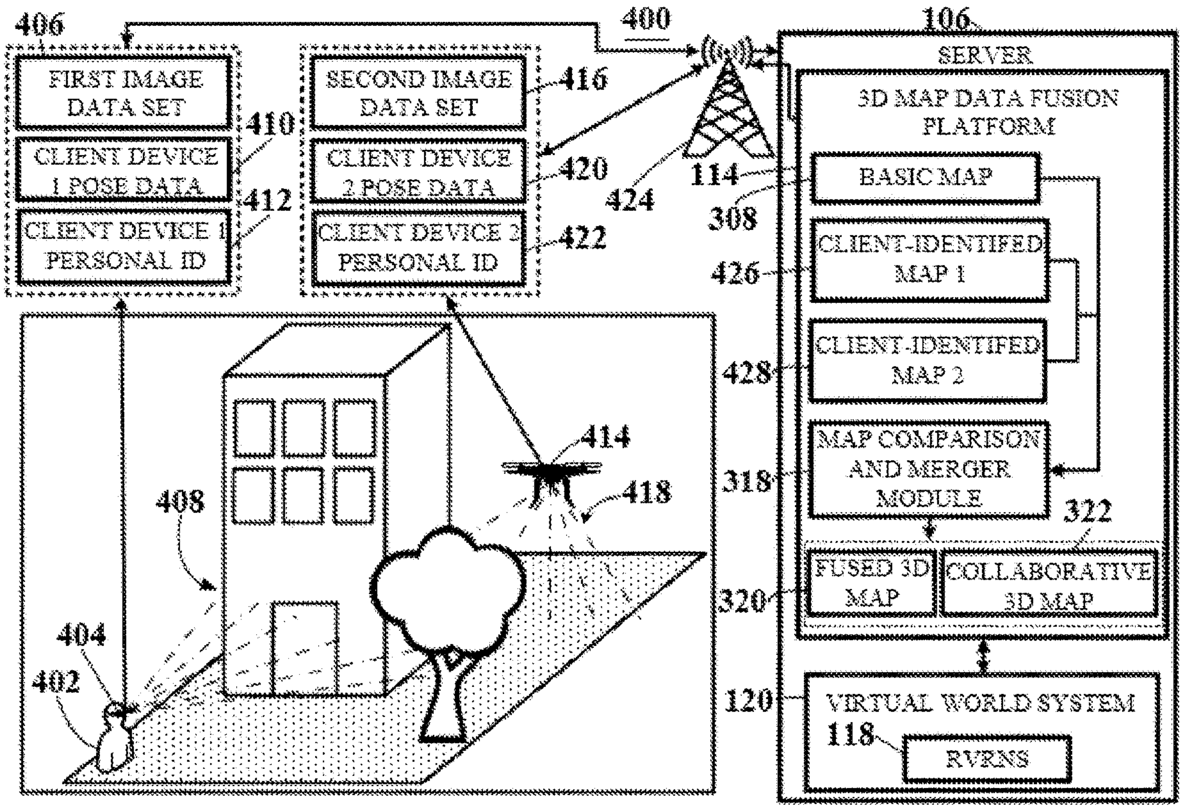
FIG. 4 depicts a schematic representation of SLAM scanning by two or more client devices and the flow of data to the server, according to an embodiment.

FIG. 4 depicts a schematic representation of SLAM scanning by two or more client devices and the flow of data to the server, according to an embodiment.

In FIG. 4, a user 402 wears a first client device (e.g., a wearable device 404) capturing a first image data set 406 from a first coordinate space 408 through a SLAM process, such as a coordinated SLAM process implemented by a SLAM scanning and navigation module 334 implemented in the wearable device 404 and a SLAM pipeline 310 implemented in a server computer 106, as shown in FIG. 3. The wearable device 404 may also send a first client pose data 410 and a first client device personal ID code 412 to the at least one server computer 106. Likewise, a second client device (e.g., a drone 414) captures a second image data set 416 of a second coordinate space 418 and sends the second image data set 416, along with the corresponding second client device pose data 420 and personal ID code 422, to the at least one server computer 106. Communication between the client devices and at least one server computer 106 may take place through one or more antennas 424, such as mmW antennas (e.g., such as used for 5G antenna communication systems). The personal ID codes 412 and 422 may be, for example, a QR code, URL, IP address, MAC address, cryptographic hash, universally unique identifier, or an organizationally unique identifier.

The ID codes 412 and 422 are attached to the 3D coordinates of the total area mapped by each of the client devices.

In a first stage, the 3D map data fusion platform 114 receives the data from, for example, the wearable device 404 and proceeds to compare the data to the available RVRNs 118 in the persistent virtual world system 120 through the map comparison and merger module 318. In some embodiments, the 3D map data fusion platform 114 performs a new features extraction (e.g., from a first plurality of features extracted from the first image data set 406), feature pose inference, and new map generation, through corresponding modules 312-316 as described with reference to FIG. 3. When sufficient data is available for comparison, and if the comparison results in the available RVRNs 118 not comprising or not fully comprising the first plurality of features, then the 3D map data fusion platform 114 proceeds to continue the SLAM process and create a client-identified first map 426, which refers to a SLAM-mapped first coordinate space 408 comprising a first client device personal ID code 412. The client-identified first map 426 may be further compared and combined with existing data of RVRNs 118 in the persistent virtual world system 120, forming a fused 3D map 320 that comprises client-identified areas.

Data sent by the drone 414 may also be received by the 3D map data fusion platform 114 and may go through features extraction, feature pose inference, and new map generation through corresponding modules 312-316 as described with reference to FIG. 3. When sufficient data is available for comparison, and if the comparison results in the available RVRNs 118 do not include or do not fully include the first plurality of features, then the 3D map data fusion platform proceeds to 114 to continue the SLAM process and create a client-identified second map 428, which refers to a SLAM-mapped second coordinate space 418 comprising a second client device personal ID code 422. The client-identified second map 428 is then compared, by the map comparison and merger module 318, to the fused 3D map 320, and when necessary combined, forming a collaborative 3D map that is then shared to the persistent virtual world system 120.

In some embodiments, the client-identified map area contributions are further stored in a distributed ledger. In yet further embodiments, the client-identified map area contributions may be used in a reward system comprising providing a reward in relation to the map area contribution by the client devices. For example, the coordinates and feature points within those coordinates, along with the pose data of each feature point, may be stored in ledgers, or blocks, which are growing lists of records linked and secured using cryptography to form blockchains. These blockchains may be designed to be resistant to modification of the data and can serve as an open, distributed ledger that can record the area mapped by each client device in order to support a reward system. Each block may contain a hash pointer as a link to a previous block, a timestamp, transaction data, and other data pertaining to the area mapped by a client device. For example, if the first client device mapped an area double as large as the second client device, then the reward system may calculate double as many rewards (e.g., cryptocurrencies, discount coupons, etc.) for the first client device. These transactions may further be stored in the distributed ledger in a verifiable and permanent way. The rules of such a reward system may be governed by a smart contract stored and implemented in the distributed ledger.

Figure 5:
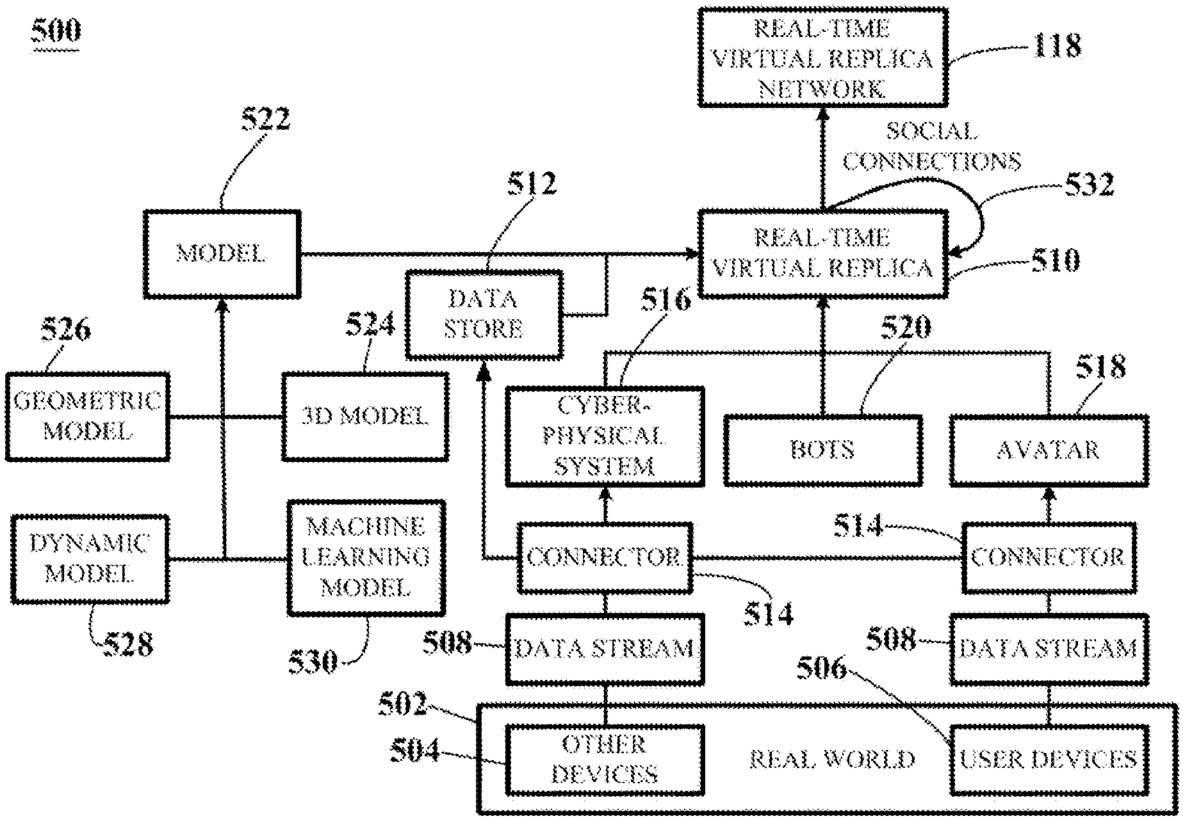
FIG. 5 depicts a diagram of the persistent virtual world system, according to an embodiment.

FIG. 5 depicts diagram showing components of an RVRN, according to an embodiment. Some elements of FIG. 5 may refer to similar or the same elements of FIGS. 1-4 and thus may use the same reference numbers.

As shown in FIG. 5, elements in the real world 502, comprising other devices 504 and user devices 506, provide data streams 508 to the persistent virtual world system. These data streams 508 can be uni-directional or bi-directional depending on the capabilities of the other devices 504 or user devices. In the current disclosure, the term "user devices" may refer to the devices that may be employed by human users to interact with applications, such as mobile devices, personal computers, game consoles, media centers, and head-mounted displays, amongst others. In the current disclosure, other devices 504 refer to technology-based systems that may connect and share data to a network excluding user devices 506, such as surveillance cameras, vehicles, traffic lights, buildings, streets, train-tracks, home appliances, robots, drones and the like.

The data streams 508 sent by other devices 504 may be obtained by sensors installed on the other devices 504, such as one or more optical sensors, temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. For example, the data streams 508 may comprise image data and pose data that can be sent to the 3D map data fusion platform for further processing before integrating feature data into the virtual replicas 510. The data streams 508 of user devices 506 may comprise, apart from sensor data, user input data resulting from interactions with applications via user devices 506.

By providing a plurality of other devices 504 and user devices 506 with sensor mechanisms constantly capturing data from the real world 502, the virtual world and each of the synchronized virtual replica 510 are kept updated with real-time, multi-source data that mirror conditions of the real world 502. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Interactions in the persistent virtual world system with the virtual replica 510 are made through the exchange of data, using publish/subscribe services connected to data stores 512 of each virtual replica 510. Data types may include periodic and aperiodic, synchronous and asynchronous data. Each virtual replica 510 keeps a data store 512 where the data can be updated by the real-world counterpart or by microservices (not shown). Data in the persistent virtual world system can be associated directly to specific virtual replicas 510 or can be processed as anonymous data, which can comprise aggregation of multiple streaming sources of related virtual replicas. For example, data from all the units of a specific model of a car could be processed and aggregated to stream data to be available for predictive maintenance services.

Microservices refer to individual services that can be developed, deployed and maintained independently, each service being configured to perform discrete tasks and communicating with other services through APIs. Each microservice can update data in the data store 512 of the virtual replicas 510 using the virtual replica models and relationships with the environment to modify the value of specific attributes of the virtual replicas 510. Microservices can use specific core services of the persistent virtual world system, such as a plurality of engines, or be connected to external platforms.

The data streams 508 may be stored in the data stores 512 via connectors 514. The connectors 514 may comprise software, hardware and/or firmware used to read data of the data streams 508 and write to the data stores 512. The connectors 514 may use publish/subscribe application programming interfaces (APIs) to connect to the data stores 512 and help to feed the virtual replicas 510 with the data streams 508 from other devices 504 and user devices 506. The data streams 508 of the other devices 504 further feed a cyber-physical system 516 through connectors 514, whereas the data streams 508 of user devices 506 feed virtual avatars 518 of the users 506 through connectors 514. System 500 also comprises implementation of bots 520, which may be include software, hardware and/or firmware configured to respond as automated agents with human or human-like behavior by employing machine learning algorithms. The human avatars 518 may be configured to display the physical characteristics of the human users, or may be configured with a different visual aspect and characteristics.

In the current disclosure, a pair of virtual-real twin, or twin-pair, can be considered as a cyber-physical system 516, which is an integration of computation with physical processes whose behavior is defined by both cyber and physical parts of the system. Therefore, a virtual replica 510 is the cyber part of the cyber-physical system 516. The virtual replica 510 may then be considered as an extension of the real twin that allows connecting the physical part with artificial intelligence and simulations to improve the capabilities and performance of the object. The virtual replica 510 may, in some embodiments, be a substitute of part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual replica 510 may also comprise models 522, which refer to any graphical, mathematical or logical representation of aspects of the reality that may be used to replicate the reality in the persistent virtual world system. In some embodiments, suitable models 522 comprise one or more of a 3D model 524, geometric model 526, dynamic model 528, and machine learning model 530. Although only four models 522 are herein disclosed, it may be understood by those skilled in the art that the system may be adapted to implement fewer or more models than those presented.

The 3D model 524 goes in hand with the geometric model 526 to show data included in each of the geometries of the virtual replica 510, such as textures, colors, shading, reflection, collision effects, and the like. The 3D models 524 comprise the 3D data structure that is used to visually represent the virtual replica 510 and other virtual elements in the persistent virtual world system, such as applications, purely virtual replicas, virtual bots, ads, etc. The 3D data structure may include, for example, one or more octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

The geometric model 524 comprises the mathematical model defining the shape of the virtual replica 510 based on the real-world element and may be complemented by the 3D model 524.

The dynamic model 528 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 530 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica 510 about the behavior of a real twin in order to simulate the behavior of the real twin.

In some embodiments, the models used in the virtual replicas 510 consider the level of detail (LOD) required by a specific scenario computation. LOD involves decreasing the complexity of a model 522 representation as the virtual replica 510 moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas, from low to high fidelity models, enabling different simulations to be performed depending on the case and situation LOD management increases the efficiency of computing processes, such as the rendering process by decreasing the workload on graphics pipeline usage, typically vertex transformations, or by enhancing physical simulation, as different 3D models 524 or dynamic models 528 can be associated to the virtual replicas 510, from low to high fidelity models, so that different simulations can be done depending on the case and situation. In general, LOD management may improve framerates and reduce memory and computing demand.

A plurality of connected virtual replicas 510 forms an RVRN 118. Each virtual replica 510 may also display social connections 532 with each other, i.e., interactions amongst each other.

In some embodiments, a virtual replica 510 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas 510 may be geolocated using a reference coordinate system suitable for use with current geolocation technologies. For example, the virtual replicas may use a World Geodetic System standard such as WGS84, which is the current reference coordinate system used by GPS.

Figure 6:
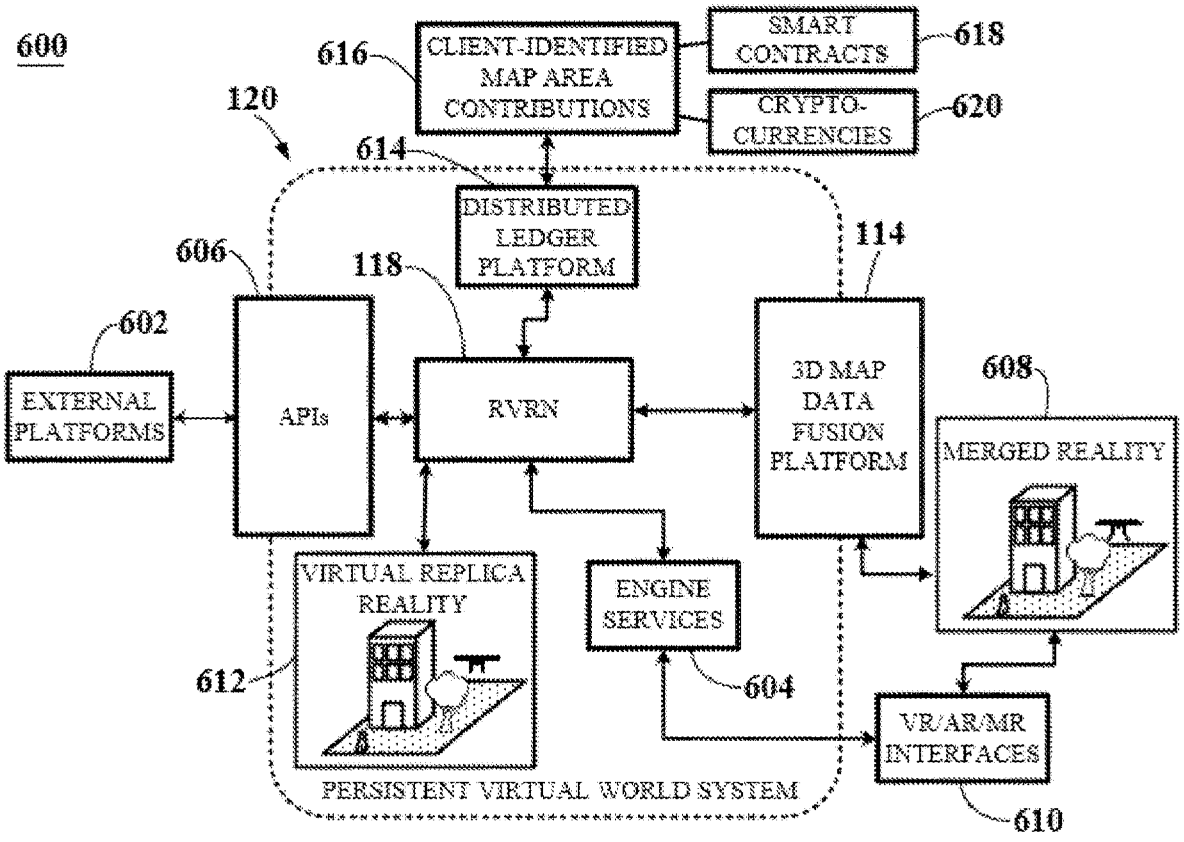
FIG. 6 depicts a further diagram of the persistent virtual world system and its relation to the 3D map data fusion platform, according to an embodiment.

FIG. 6 depicts a diagram of a system 600 describing platforms and interfaces used to generate RVRNs used in a merged reality system, according to an embodiment. The elements located within the dotted lines represent the persistent virtual world system 120 where virtual replicas and RVRNs 118 reside.

As shown in FIG. 6, the RVRN 118 can connect to a plurality of external platforms 602 or to engine services 604 included in the persistent virtual world system 120. The plurality of external platforms may include, for example, an Internet of Things (IoT) platform, machine learning (ML) platform, big data platform, and simulation platform, which may connect to the persistent virtual world system 120 through APIs 606, in order to provide and manipulate models and consume or publish data to the virtual replicas.

The IoT platform refers to software, hardware and/or firmware that enable the management of multi-source input data received from sensors in other devices and user devices. The ML platform refers to software, hardware and/or firmware that provide the RVRNs 118 with the capability to use machine learning models and algorithms for artificial intelligence applications. The big data platform refers to software, hardware and/or firmware that enables organization in developing, deploying, operating and managing big data related to the RVRN 118. The simulation platform refers to software, hardware and/or firmware that enable using the RVRNs 118 and their data and models in order to virtually recreate the real behavior of the real-world entities.

The engine services 604 included in the persistent virtual world system 120 may include, for example, an artificial intelligence engine, a simulation engine, a 3D engine, and a haptic engine, amongst others. The artificial intelligence engine refers to software, hardware and/or firmware that enables the management and application of machine learning models and algorithms for artificial intelligence applications. The simulation engine refers to software, hardware and/or firmware that enable using virtual replicas and their data and models in order to virtually recreate the real behavior of the real-world entities. The 3D engine refers to software, hardware and/or firmware that may be used in the creation and processing of 3D graphics of the virtual replicas. The haptic engine refers to software, hardware and/or firmware that enables implementing haptic features to applications and virtual replicas to provide a touch based interaction to the users. The persistent virtual world system 120 also connects to a spatial data streaming platform configured for the optimized exchange and management of real and virtual spatial data in the persistent virtual world system 120 and between the persistent virtual world system 120 and a merged reality 608.

Some of the engine services 604 (e.g., the 3D engine and haptic engine) may connect to the merged reality 608 via suitable digital reality interfaces 610 in user devices, enabling accessing the merged reality in any of virtual reality or augmented reality. The merged reality 610 provides users with an extended reality where real elements are overlapped or augmented by persistent virtual objects, anchored in specific geo-locations or to real elements in the reality, and comprising AI and simulations connected to the virtual replicas of the reality. Users can interact without limitations with this merged reality 608 through his/her avatar.

In some embodiments, collaborative mapping data may be obtained and processed by the 3D map data fusion platform 114 in order to compare, match, and combine several detailed, 3D maps to the existing RVRNs 118 of the persistent virtual world system 120.

The RVRN 118 is an integral part of the persistent virtual world system 120 and enables an implementation of a virtual replica reality 612, where all real-world elements are completely virtual and may be virtually enhanced (e.g., adding features to the virtual replicas that the real-world elements may not have). In the current disclosure, the virtual replica reality 612 differs from the typical concept of virtual reality, in that virtual reality may represent an immersive realization of the world where all elements are virtual, while the virtual replica reality 612 takes into account the context, accurate geolocation based on the real world objects, and interactions and connections between the virtual replicas, which may be kept continuously updated (or periodically or intermittently updated as computing resources and conditions permit) through the data and models input and manipulated via the plurality of platforms and/or engines. Thus, the virtual replica reality 612 refers to the actual virtual replica of the world within the persistent virtual world system, wherein the persistent virtual world system provides the data, models, interactions, connections and infrastructure enabling the self-computing capabilities and autonomous behavior of each virtual replica.

In yet further embodiments, the system 600 may store in the memory of at least one server separate layers for augmented reality and virtual reality. The separate layers may enable accessing, through the merged reality 608, the virtual replica reality 612 in any of augmented or virtual reality, and may be activated through user devices connected the at least one server computer whenever accessing one or the other type of reality. Each of the layers may comprise augmentations of reality and virtual replicas that may be specific to each layer. For example, when accessing the merged reality 608 in augmented reality, a user may view the real objects located in the current merged reality scene, the current augmentations of each real object via the corresponding virtual replicas, and the purely virtual objects configured to be visible only in augmented reality. In another example, when viewing the merged reality 608 in virtual reality, the user may only view a version of the virtual replica reality 612 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality.

In further embodiments, the RVRNs 118 connect to a distributed ledger platform 614, which may store client-identified map area contributions 616. In some embodiments, the client-identified map area contributions 616 may be used in a reward system comprising providing a reward in relation to the map area contribution by the client devices, which may be governed by corresponding smart contracts 618 in order to provide corresponding rewards (e.g., crypto currencies 620) to users according to their map contributions.

Figure 7:
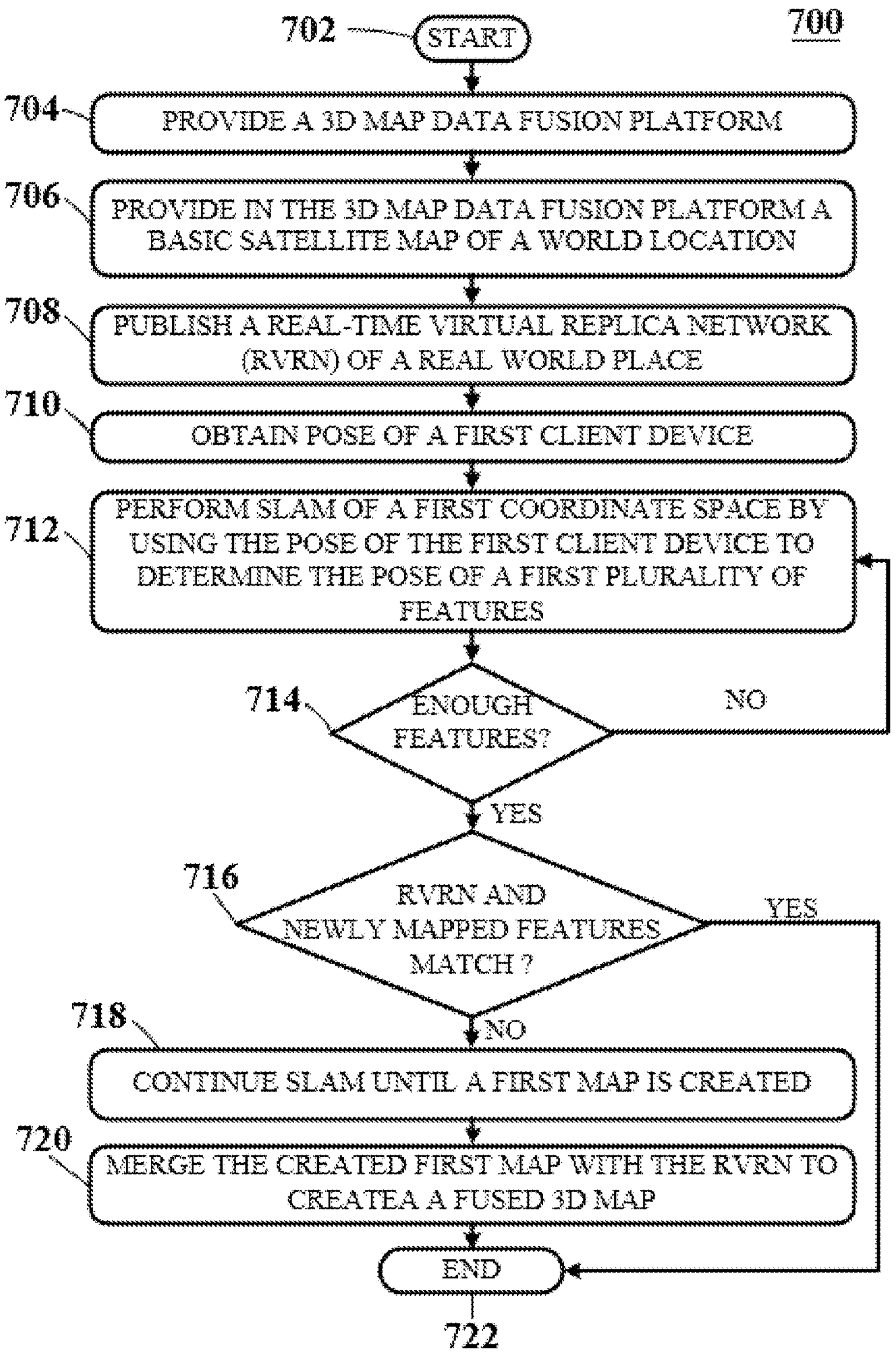
FIG. 7 depicts a block diagram of a method enabling an updatable collaborative 3D map data fusion platform and a persistent virtual world system thereof, according to an embodiment.

FIG. 7 depicts a block diagram of a method 700 enabling an updatable collaborative 3D map data fusion platform and a persistent virtual world system thereof, according to an embodiment.

Method 700 of the current disclosure begins in steps 702 and 704 by providing a 3D map data fusion platform in memory of a server computer comprising at least one processor (e.g., 3D map data fusion platform 114 as described with respect to FIGS. 1-4 and 6). In step 706, method 700 continues by providing in the 3D map data fusion platform a basic satellite map of a world location. In some embodiments, the basic satellite map is obtained by satellite mapping techniques using satellite imagery of one or more public or private global, regional or local maps connecting to the 3D map data fusion platform (e.g., through a plurality of corresponding APIs.

In step 708, the method continues by publishing in the 3D map data fusion platform an RVRN (e.g., RVRNs 118 from FIGS. 1-6) of a real world place with reference to the basic satellite map (e.g., aligned, if available, to the coordinates of the basic satellite map). Following the process, in step 710 the method 700 continues by obtaining the pose of a first client device, which may be performed through position and orientation determination and tracking techniques and algorithms from sensor data obtained by sensors (e.g., IMUs, accelerometers, and gyroscopes), through the use of external sensors (e.g., cameras), or combinations thereof. Subsequently, the method proceeds in step 712 by performing a SLAM process of a first coordinate space, wherein the SLAM process uses image data from at least one imaging device of the first client device and the pose of the first client device to determine the pose of a first plurality of features within the first coordinate space. In some embodiments, the image data is captured by one or more imaging devices of the client device during a coordinated implementation of a SLAM pipeline, which is performed at least in part by the 3D map data fusion platform and by the client device through a SLAM scanning and navigation module stored in memory of the client device and executed by at least one processor thereof. In some embodiments, the image data may be pre-processed through computer instructions of the SLAM scanning and navigation module executed by the at least one processor of the client device.

The method 700 continues by creating a new map comprising a first plurality of features within the first coordinate space. In the example shown in FIG. 7, this includes performing the functionality in step 714 by checking whether enough features have been extracted from the image data in order to make a comparison of the new data with the RVRN data. If not enough features have been captured, the method continues in step 712 by continuing the SLAM process. Once enough features of the first coordinate space have been mapped, the method 700 continues in step 716 by comparing, through feature matching algorithms by the 3D map data fusion platform, the mapped first plurality of features with the published RVRN in order to check whether the mapped first plurality of features is comprised, or partially comprised, in the RVRN. If the mapped first plurality of features is not comprised or is only partially comprised in the RVRN, the SLAM process may continue in step 718 until a first new map is created. The first new map may then be merged with the RVRN in order to create a fused 3D map, as seen in step 720. However, if the published detailed RVRN comprises the newly mapped features, method 700 may end in terminator 722.

Figure 8:
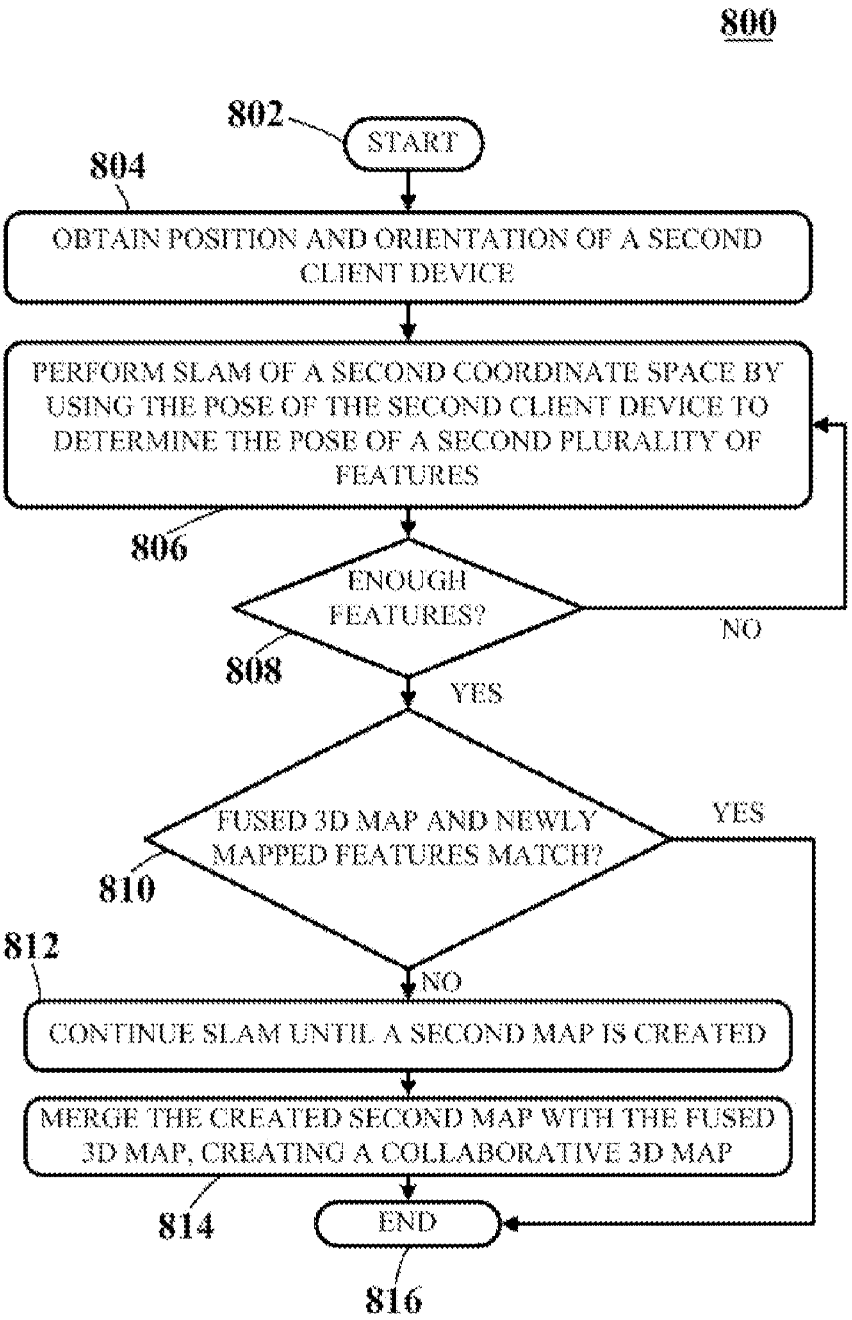
FIG. 8 depicts a block diagram of further steps of the method enabling an updatable collaborative 3D map data fusion platform and a persistent virtual world system thereof, according to an embodiment.

FIG. 8 depicts a block diagram of a method 800 that may be used in combination with the method 700 enabling an updatable collaborative 3D map data fusion platform and a persistent virtual world system thereof, according to an embodiment.

Method 800 begins in steps 802 and 804 by obtaining the position and orientation of a second client device. Then, in step 806, the method continues by performing a SLAM process of a second coordinate space, which uses image data from at least one imaging device of the second client device and the pose of the second client device to determine the pose of a second plurality of features within the second coordinate space. In step 808, the method 800 proceeds by checking whether enough features have been extracted from the image data in order to make a comparison of the new data with the fused 3D map data.

If not enough features have been captured, the method proceeds in step 806 by continuing the SLAM process. Once enough features of the first coordinate space have been mapped, the method 800 continues by creating a second new map comprising the second plurality of features. In the example shown in FIG. 8, this includes performing the functionality in step 810 by comparing, through feature matching algorithms by the 3D map data fusion platform, the mapped second plurality of features with the fused 3D map in order to check whether the mapped second plurality of features is comprised, or partially comprised, in the fused 3D map. If the mapped first plurality of features is not comprised or is only partially comprised in the fused 3D map, the SLAM process may continue in step 812 until a second new map is created. The second new map may then be merged with the fused 3D map, creating a collaborative 3D map, as shown in step 814. However, if the fused 3D map comprises the newly mapped features, method 800 may end in terminator 816.

In yet further embodiments, the method also comprises sharing the collaborative 3D map with a persistent virtual world system, wherein the plurality of features of the collaborative 3D map are shared with the persistent virtual world system as part of virtual objects.

Figure 9:
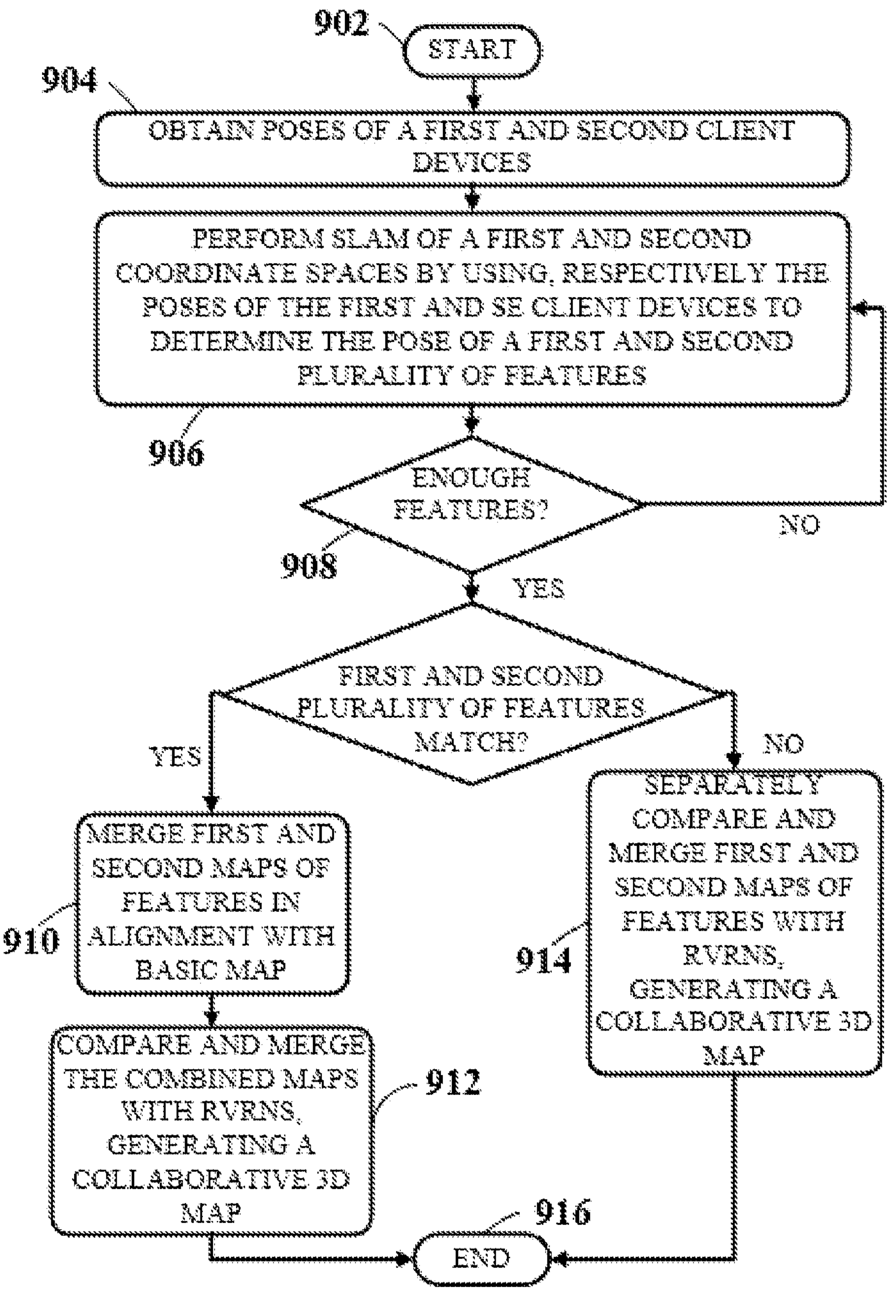
FIG. 9 depicts a block diagram of a method whereby image data is received from first and second client devices, enabling an updatable collaborative 3D map data fusion platform and a persistent virtual world system thereof, according to an embodiment.

FIG. 9 depicts a block diagram of a method 900 whereby image data is received simultaneously from both the first and second client devices, enabling an updatable collaborative 3D map data fusion platform and a persistent virtual world system thereof.

Method 900 may start at step 902 performing the actions of steps 702-708 of FIG. 7. Afterward, in step 904, method 900 may proceed by obtaining the poses of first and second client devices. In step 906, the method may proceed by simultaneously performing a SLAM process of a first and second coordinate spaces by capturing image data from at least one imaging device of the first and second client devices, wherein said SLAM processes are performed by using the pose of the first and second client devices to determine the pose of a first and second plurality of features within the first and second coordinate spaces. Then, in step 908, the method 900 may proceed by checking whether enough features have been extracted, so that, in step 910, the features may be compared and matched. If the first and second pluralities of features match, then the method 900 proceeds by merging the first and second maps of features, wherein said merging is performed in alignment with the basic map. Subsequently, the method 900 proceeds by comparing and merging the combined maps with the RVRNs, generating a collaborative 3D map.

If the first and second pluralities of features do not match, the method 900 may proceed in step 914 by separately comparing and merging the first and second maps of features with RVRNs, generating a collaborative 3D map. After steps 912 or 914, the method 900 may end in terminator 916.

Figure 10:
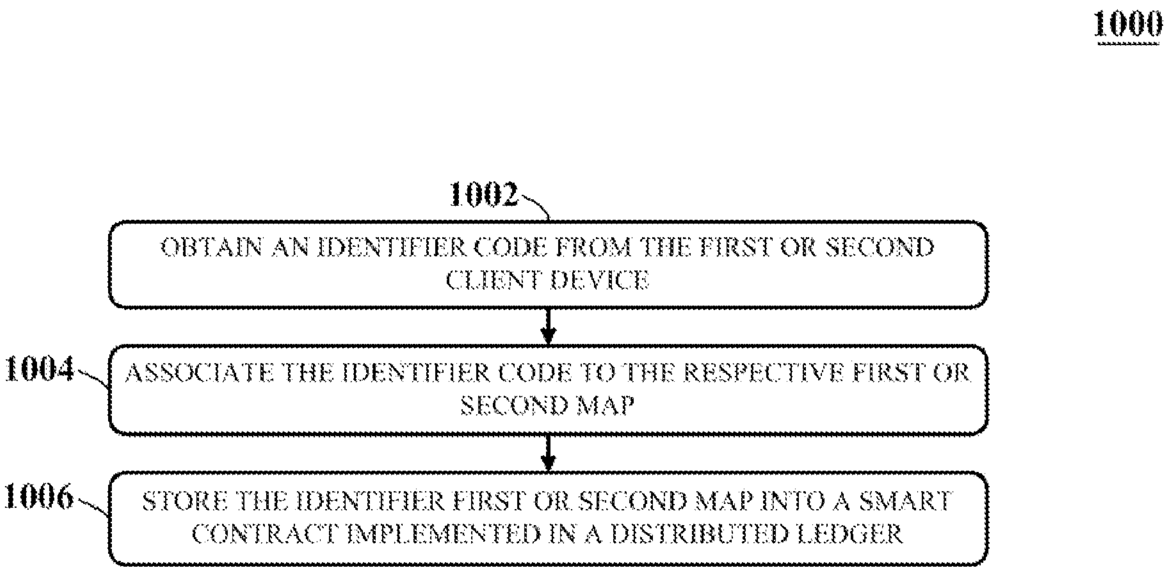
FIG. 10 depicts a block diagram of a method showing further steps of the method enabling an updatable collaborative 3D map data fusion platform and a persistent virtual world system thereof, according to an embodiment.

FIG. 10 depicts a block diagram of a method 1000 showing further steps of the method enabling an updatable collaborative 3D map data fusion platform and a persistent virtual world system thereof, according to an embodiment.

Method 1000 may start in step 1002 by obtaining an identifier code from the first or second client device. The personal ID codes may be, for example, a QR code, URL, IP address, MAC address, cryptographic hash, universally unique identifier, or an organizationally unique identifier. The ID codes are attached to the 3D coordinates of the total area mapped by each of the client devices. Then, in step 1004, the method may continue by associating the identifier codes respectively to the first or second maps. Finally, the method 1000 may end in step 1006 by storing the identified first or second map into a smart contract implemented in a distributed ledger. In yet further embodiments, the client-identified map area contributions may be used in a reward system comprising providing a reward in relation to the map area contribution by the client devices.

Figure 11:
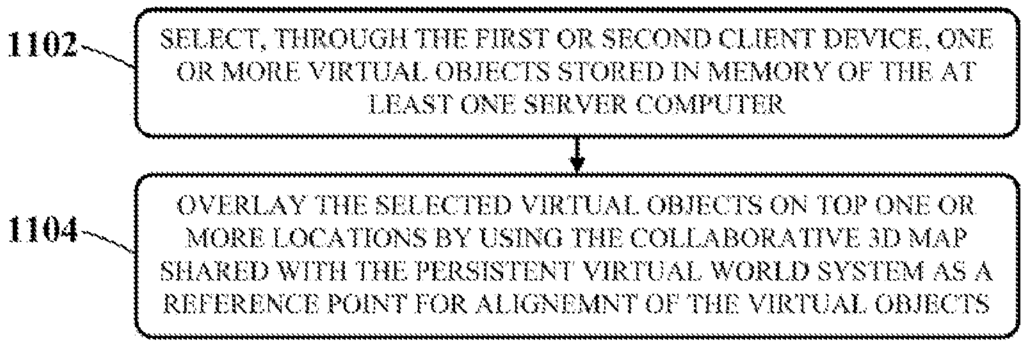
FIG. 11 depicts a block diagram depicting further steps of the method enabling an updatable collaborative 3D map data fusion platform and a persistent virtual world system thereof, according to an embodiment.

FIG. 11 depicts a block diagram depicting further steps of the method enabling an updatable collaborative 3D map data fusion platform and a persistent virtual world system thereof, according to an embodiment.

Method 1100 may start at step 1102 by selecting, through the first or second client device, one or more virtual objects stored in memory of the at least one server computer. Then, in step 1104, the method 1100 may end by overlaying the selected virtual objects on top of one or more locations by using the collaborative 3D map shared with the persistent virtual world system as a reference for alignment of the virtual objects.

Computer-readable media having stored thereon instructions configured to cause one or more computers to perform any of the methods described herein are also described. A computer readable medium may include volatile or nonvolatile, removable or nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, Javascript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A method comprising:

providing a three-dimensional (3D) map data fusion platform in memory of a server comprising at least one processor;

providing in the 3D map data fusion platform a map comprising imagery of a real-world location;

publishing in the 3D map data fusion platform with reference to the map a real-time virtual replica network (RVRN), wherein the RVRN comprises a plurality of 3D virtual replicas, each of the 3D virtual replicas corresponding to a real-world object in the real-world location and comprising a plurality of object features, the object features including: a real-time position, orientation, and a 3D structure;

obtaining a pose of a first client device;

performing a simultaneous location and mapping (SLAM) process of a first coordinate space, wherein the SLAM process uses image data from an imaging device of the first client device, the pose of the first client device and data of the map to determine a pose of a first plurality of features within the first coordinate space;

creating a first new map comprising 3D coordinates of the first plurality of features within the first coordinate space; and merging, by the 3D map data fusion platform, the first new map comprising the 3D coordinates of the first plurality of features within the first coordinate space with the published RVRN, creating a fused 3D map.

2. The method of claim 1 wherein creating the first new map comprises comparing, through one or more feature matching algorithms by the 3D map data fusion platform, the first plurality of object features with the published RVRN.

3. The method of claim 2, wherein the comparing step takes place once a threshold number of features of the first coordinate space has been reached.

4. The method of claim 1, further comprising:

obtaining a pose of a second client device;

initiating a SLAM process of a second coordinate space, wherein the SLAM process of the second coordinate space uses image data from at least one imaging device of the second client device, the pose of the second client device and data of the fused 3D map to determine a pose of a second plurality of features within the second coordinate space;

creating a second new map comprising the second plurality of features; and merging, by the 3D map data fusion platform, the second new map with the fused 3D map, creating a collaborative 3D map.

5. The method of claim 4, further comprising sharing the collaborative 3D map with a persistent virtual world system, wherein newly mapped real-world objects are added to the persistent virtual world system.

6. The method of claim 4, further comprising:

selecting, through the first or second client device, one or more virtual objects; and overlaying, by the first or second client device, the selected virtual objects on top of one or more locations by using the collaborative 3D map shared with a persistent virtual world system as a reference for alignment of the virtual objects.

7. The method of claim 4, further comprising:

obtaining an identifier code from the first or second client device;

associating the identifier code with the first new map or the second new map; and storing the map with which the identifier code is associated in a smart contract implemented in a distributed ledger.

8. The method of claim 7, wherein the stored map is used in a reward system comprising providing a reward in relation to a map area contribution by the first or second client device.

9. The method of claim 1, further comprising adding per-user entitlement information to the image data, wherein only entitled users have access to viewing the image data of the location.

10. The method of claim 1, wherein the SLAM process is partially performed by a processor of the first client device and by the server.

11. A system enabling an updatable 3D spatial map comprising:

at least one server computer comprising memory and at least one processor, the memory storing a three-dimensional (3D) map data fusion platform, wherein the at least one server computer is configured to:

provide in the 3D map data fusion platform a map comprising imagery of a real-world location;

publish in the 3D map data fusion platform with reference to the map a real-time virtual replica network (RVRN), wherein the RVRN comprises a plurality of 3D virtual replicas, each of the 3D virtual replicas corresponding to a real-world object in the real-world location and comprising a plurality of object features, the object features including: a real-time position, orientation, and a 3D structure;

obtain a pose of a first client device;

initiate a simultaneous location and mapping (SLAM) process of a first coordinate space, wherein the SLAM process uses image data from an imaging device of the first client device and the pose of the first client device to determine a pose of a first plurality of features within the first coordinate space;

create a first new map comprising 3D coordinates of the first plurality of features within the first coordinate space; and merge, by the 3D map data fusion platform, the first new map comprising the 3D coordinates of the first plurality of features within the first coordinate space with the published RVRN, creating a fused 3D map.

12. The system of claim 11 wherein creating the first new map comprises comparing, through one or more feature matching algorithms by the 3D map data fusion platform, the first plurality of object features with the published RVRN.

13. The system of claim 12, wherein the comparing step takes place once a threshold number of features of the first coordinate space has been reached.

14. The system of claim 11, wherein the at least one server computer is further configured to:

initiate a SLAM process of a second coordinate space, wherein the SLAM process of the second coordinate space uses image data from at least one imaging device of a second client device and a pose of the second client device to determine a pose of a second plurality of features within the second coordinate space;

create a second new map comprising the second plurality of features; and merge, by the 3D map data fusion platform, the second new map with the fused 3D map, creating a collaborative 3D map.

15. The system of claim 14, wherein the collaborative 3D map is shared with a persistent virtual world system, wherein newly mapped real-world objects are added to the persistent virtual world system.

16. The system of claim 11, wherein the at least one server computer is further configured to:

obtain an identifier code from the first client device;

associate the identifier code with the first new map; and store the identified first new map in a smart contract implemented in a distributed ledger, wherein the stored identified map is used in a reward system comprising providing a reward in relation to a map area contribution by the first client device.

17. The system of claim 11, wherein the first client device is configured to select one or more virtual objects stored in memory of the server, and to overlay the selected one or more virtual objects on top of one or more locations by using the fused 3D map as a reference.

18. A non-transitory computer-readable medium having stored thereon computer-executable instructions configured to cause one or more processors to perform steps comprising:

providing a three-dimensional (3D) map data fusion platform;

providing in the 3D map data fusion platform a map comprising imagery of a real-world location;

publishing in the 3D map data fusion platform with reference to the map a real-time virtual replica network (RVRN), wherein the RVRN comprises a plurality of 3D virtual replicas, each of the 3D virtual replicas corresponding to a real-world object in the real-world location and comprising a plurality of object features, the object features including: a real-time position, orientation, and a 3D structure;

obtaining a pose of a first client device;

performing a simultaneous location and mapping (SLAM) process of a first coordinate space, wherein the SLAM process uses image data from an imaging device of the first client device, the pose of the first client device and data of the map to determine a pose of a first plurality of features within the first coordinate space;

creating a new map comprising 3D coordinates of the first plurality of features within the first coordinate space; and merging, by the 3D map data fusion platform, the first new map comprising the 3D coordinates of the first plurality of features within the first coordinate space with the published RVRN, creating a fused 3D map.

19. The non-transitory computer-readable medium of claim 18 wherein creating the first new map comprises comparing, through one or more feature matching algorithms, the first plurality of features with the published RVRN.

20. The non-transitory computer-readable medium of claim 19, wherein the comparing step takes place once a threshold number of features of the first coordinate space has been reached.

21. The non-transitory computer-readable medium of claim 18 wherein the computer-executable instructions are further configured to cause the processor to connect the RVRN to a plurality of external platforms or engine services in order to provide and manipulate models and consume or publish data to the 3D virtual replicas of the RVRN.

* * * * *